United States Patent
Beshai et al.

(10) Patent No.: US 6,721,271 B1
(45) Date of Patent: Apr. 13, 2004

(54) RATE-CONTROLLED MULTI-CLASS HIGH-CAPACITY PACKET SWITCH

(75) Inventors: Maged E. Beshai, Stittsville (CA); Ernst A. Munter, Kanata (CA)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/244,824

(22) Filed: Feb. 4, 1999

(51) Int. Cl.[7] .................................................. H04L 1/00
(52) U.S. Cl. .................................... 370/232; 370/358
(58) Field of Search .................. 370/232, 235–236, 370/395.4, 395.42, 395.43, 411, 413, 412, 374, 395.41, 503, 509, 514, 358, 392, 389, 399, 401, 409; 709/229

(56) References Cited

U.S. PATENT DOCUMENTS

| | | | |
|---|---|---|---|
| 4,922,487 A | * 5/1990 | Eilenberger et al. | 370/411 |
| 5,126,999 A | 6/1992 | Munter et al. | 370/415 |
| 5,127,000 A | 6/1992 | Henrion | 714/43 |
| 5,475,679 A | 12/1995 | Munter | 370/395.4 |
| 5,745,486 A | 4/1998 | Beshai et al. | 370/395.71 |
| 5,901,140 A | * 5/1999 | Van As et al. | 370/236 |
| 5,905,725 A | 5/1999 | Sindhu et al. | 370/389 |
| 6,134,217 A | * 10/2000 | Stiliadis et al. | 370/232 |
| 6,295,295 B1 | * 9/2001 | Wicklund | 370/393 |
| 6,317,433 B1 | * 11/2001 | Galand et al. | 370/395.2 |
| 6,324,165 B1 | * 11/2001 | Fan et al. | 370/232 |
| 6,356,546 B1 | * 3/2002 | Beshai | 370/358 |

FOREIGN PATENT DOCUMENTS

| | | | |
|---|---|---|---|
| GB | 2 254 529 | 3/1992 | H04L/12/56 |
| WO | WO 99/03237 | 1/1999 | H04L/12/56 |

OTHER PUBLICATIONS

Obara H et al: "Input and Output Queueing ATM Switch Architecture with Spatial and Temporal Slot Reservation Control" Electronics Letters, GB, IEE Stevenage, vol, 28, No. 1, Jan. 1, 1992, pp. 22–24 XP0002789931.

* cited by examiner

*Primary Examiner*—Chi Pham
*Assistant Examiner*—Alexander O. Boakye
(74) *Attorney, Agent, or Firm*—Max R. Wood; Ogilvy Renault

(57) ABSTRACT

A high-capacity switch for transferring variable-sized packets under rate control is described. The packets are divided in the switch into segments of predetermined equal size. The packets are reconstructed before egress from the switch. The switch serves traffic of different classes of service, but the class of service distinction is relevant only at the ingress or egress modules. The switch control is preferably centralized to facilitate effective sharing of the inner capacity of the switch. The control is based on modulating the ingress/egress rate according to traffic load, the central control being unaware of the class of service disposition of the traffic it controls. The advantage is a high capacity switch adapted to transfer variable-sized packets with guaranteed rate control.

24 Claims, 19 Drawing Sheets

DIAGONAL-SET SCHEDULING $g \times n$ vs. $n^g$

256 INGRESS PORTS
256 EGRESS PORTS

| NUMBER OF STAGES | SIZE OF A UNIT IN A PARALLEL STRUCTURE<br>g | DURATION OF PARALLEL PROCESS<br>n | <br>$g \times n$ | NUMBER OF EXAMINED ENTITIES<br>$n^g$ |
|---|---|---|---|---|
| ONE STAGE | 1 | 256 | 256 | 256 |
| TWO STAGES | 2 | 16 | 32 | 256 |
| FOUR STAGES | 4 | 4 | 16 | 256 |
| EIGHT STAGES | 8 | 2 | 16 | 256 |

FIG. 18

RATE-CONTROLLED MULTI-CLASS HIGH-CAPACITY PACKET SWITCH

TECHNICAL FIELD

This invention relates generally to the field of data packet switching and, in particular, to a rate-controlled very high-capacity switching node adapted to transfer data packets of variable size.

BACKGROUND OF THE INVENTION

There is a need for data networks adapted to transfer data in packets of varying and arbitrary size. A principal design objective for switching nodes in such networks is to realize a switch of scalable capacity and controlled service quality. A popular approach to achieving this objective is to build networks based on the Asynchronous Transfer Mode (ATM) protocol. ATM protocol has, in fact, succeeded in facilitating the construction of very-high capacity switches and in providing effective means of service-quality control by enabling the enforcement of data transfer rate control. ATM, however, is only adapted to switch packets, referred to as cells, of a 53-byte fixed cell length. Switching cells of fixed size rather than packets of variable size simplifies the design of switches.

ATM switches are cell-synchronous switches and are somewhat simpler to build and grow than a switch adapted to switch variable-sized packets. However, there is a disadvantage in using a network that operates under a protocol which accommodates only fixed-size cells. When variable sized packets are transferred through such a network, the packets must be deconstructed at a network edge device and packed into an appropriate number of cells. In the process of packing the contents of the packets into cells, a proportion of the cells is underutilized and must be padded with null data. Consequently, a proportion of the transport capacity of the network is wasted because of the partially filled cells. Another disadvantage of transferring variable-sized packets in cells is that when a single cell is lost from a packet, the entire packet must be discarded but this is undetectable until all the remaining cells reach a destination edge of the network. When a cell belonging to a given packet is lost, the remaining cells are unknowingly transferred on to the destination edge of the ATM network, only to be discarded there because the packet is incomplete. If a packet is transferred as a single entity the entire packet may be lost at a point of congestion, but further downstream consumption of network resources is avoided.

A node adapted to switch variable-sized packets may be more complex than a node adapted to switch fixed-sized packets (cells). However, the cost resulting from the extra complexity is more than offset by the increased efficiency gained in the network. Connections can be established in a network using variable-sized packet switches, and the connections can be rate-controlled on either a hop-by-hop or end-to-end basis, so that sufficient transfer capacity can be reserved to satisfy service quality requirements. One network architecture for achieving this is a network that employs the Universal Transfer Mode (UTM) protocol, described in detail in U.S. patent application Ser. No. 09/132,465 to Beshai, filed Aug. 11, 1998. UTM retains many of the desirable features of ATM but adds more flexibility, such as the option to mix connection-based and connectionless traffic, yet significantly simplifies connection-setup, routing, and flow-control functions. The simplicity of connection-setup facilitates the use of adaptive means of admission control. Admission control is often based on traffic descriptors which are difficult, if not impossible, to determine with a reasonable degree of accuracy. An alternative is to use adaptive admission control that is based on monitoring the network traffic and requesting a change in transfer allocations on the basis of both the traffic load and class of service distinctions. The traffic at each egress module is sorted according to destination and class of service. The packets thus sorted are stored in separate logical buffers (usually sharing the same physical buffer) and the occupancies of the buffers are used to determine whether the capacity of a connection should be modified.

In a network shared by a variety of users, class of service distinctions are required to regulate traffic flow across the network. Several traffic types may share the network, each traffic type specifying its own performance objectives. Enforcing class of service distinctions within a switching node adds another dimension that can potentially complicate the design of the switch.

A high capacity switch is commonly constructed as a multi-stage, usually three-stage, architecture in which ingress modules communicate with egress modules through a switch core stage. The transfer of data from the ingress modules to the egress modules must be carefully coordinated to prevent contention and maximize the throughput of the switch. Within the switch, the control may be distributed or centralized. A centralized controller must receive traffic state information from each of the N ingress modules. Each ingress module reports the volume of waiting traffic destined to each of N egress modules. The centralized controller therefore receives $N^2$ elements of traffic information with each update. If, in addition, the controller is made aware of the class of service distinctions among the waiting traffic, the number of elements of traffic information increases accordingly. Increasing the number of elements of traffic information increases the number of control variables and results in increasing the computational effort required to allocate the ingress/egress capacity and to schedule its usage. It is therefore desirable to keep the centralized controller unaware of class of service distinctions while providing a means of taking the class of service distinctions into account during the ingress/egress transfer control process.

A high capacity ATM switch which uses a space switch core to interconnect ingress modules to egress modules is described in U.S. Pat. No. 5,475,679 which issued to Munter on Dec. 12, 1995. The controller of the switch coordinates the transfer of bursts of ATM cells between the ingress modules and the egress modules. One of the limitations of the space switch architecture, whether applied to TDM or ATM, is the necessity to arbitrate among a multiplicity of ingress/egress connection attempts.

This limitation can be removed by spatial disengagement using a rotator-based switch architecture. In the rotator-based switch architecture, the space switch core is replaced by a bank of independent memories that connect to the ingress modules of the switch through an ingress rotator. Traffic is transferred to the egress modules of the switch through an egress rotator. The two rotators are synchronized. A detailed description of the rotator switch architecture is provided in U.S. Pat. No. 5,745,486 that issued to Beshai et al. on Apr. 28, 1998.

The rotator switch architecture described by Beshai et al. works well for fixed length packet protocols such as asynchronous transfer mode (ATM). It is not adapted for use with variable sized packets, however. Consequently, there is a need for a switch that can efficiently transfer variable sized packets. To be commercially viable, the switch must also be adapted to operate in an environment that supports multiple classes of service and is rate-regulated to ensure a committed quality of service.

OBJECTS OF THE INVENTION

It is therefore an object of the invention to provide a method and an apparatus for switching variable sized packets at a controlled rate determined by traffic class of service and destination.

It is another object of the invention to provide a rate-controlled, variable-sized packet switch having a very high capacity.

It is a further object of the invention to provide a rate-controlled, variable-sized packet switch in which a core controller for the switch need not be aware of class-of-service distinctions.

It is yet another object of the invention to provide a variable-sized packet switch in which the variable-sized packets are segmented on ingress into fixed size segments, data in a last segment in each packet being padded with null data, if necessary.

It is another object of the invention to provide a packet switch in which ingress packet segments are sorted by egress module and packet segments waiting for egress are sorted by ingress module in order to facilitate the re-assembly of the variable-sized packets.

It is another object of the invention to provide a packet switch in which ingress packets are sorted by both egress module and class of service, and packets waiting for egress are sorted by both ingress module and class of service.

It is yet a further object of the invention to provide a rate-controlled variable-sized packet switch having a central controller which receives data from the ingress modules and computes transfer allocations based on the data received.

It is another object of the invention to provide a rate-controlled variable-sized packet switch in which the controller further schedules the transfer allocations and supplies each ingress module with a transfer schedule on a periodic basis.

SUMMARY OF THE INVENTION

The invention relates to a switch architecture designed for switching packets of arbitrary and variable size under rate control from ingress to egress. Two alternative architectures are described. The first uses a space-switched core, and the second uses a core that consists of an array of memories interposed between two rotators that function in combination like a flexible space switch. Each of these architectures has been used for fixed-sized packet applications such as ATM, as described above. Control methods in accordance with the invention utilize these known switch architectures to achieve high-speed switching of variable-sized packets.

In order to implement the control methods in accordance with the invention, the switch apparatus must include buffers that permit ingress packets to be sorted by output module and permit packets waiting for egress to be sorted by ingress module. Preferably, the packets are also sorted by class of service at both the ingress modules and the egress modules.

According to a first aspect of the invention there is provided a method of reciprocal traffic control in a switching node for use in a data packet network, the switching node including N ingress modules and M egress modules, N and M being integers greater than one, and a switching core adapted to permit packets to be transferred from any one of the ingress modules to any one of the egress modules, comprising the steps of:

sorting data packets into ingress buffers at the ingress modules so that the packets are arranged in egress module order;

associating a label with each packet to permit an ingress module at which the packet was received to be identified; and sorting data packets into egress buffers at the egress modules using the label to determine a sort order of the data packets in the egress buffers.

The packets in each set of buffers are also preferably sorted by class of service. Class of service information is hidden from a transfer allocation mechanism, however. The traffic-load data and the guaranteed minimum rates determined by a connection-admission-control process are passed to the transfer allocation mechanism which computes a transfer schedule for each ingress/egress pair of modules. An advantage of containing the class of service differentiation in the ingress modules is that the switch becomes more scaleable because a computational bottleneck in the central control is avoided.

In order to facilitate the transfer of variable-sized packets through the core, the packets are divided in the ingress modules into packet segments of equal size. A last segment of each packet is padded with null data, if required. Each packet is appended to a header that contains a label which identifies the ingress module, identifies whether the packet segment is a last segment in a packet, and further identifies whether a last packet segment is a full-length packet segment or a null-padded packet segment. The packet segments are sorted in the ingress modules using the labels to determine a sort order. Consequently, the packets are ordered for re-assembly in the egress module and are transferred from the switch in the variable-sized format in which they were received.

The mechanism for selecting segments for transfer to the core is preferably operable independently of the conditions at others of the input modules. This enables the mechanism for selecting segments for transfer to be simpler, and therefore faster and easier to scale up.

The mechanism for selecting segments to be transferred preferably enables better sharing of core capacity between input modules, while confining the additional complexity related to the management of class of service to the ingress modules.

BRIEF DESCRIPTION OF THE DRAWINGS

The invention will now be further explained by way of example only, and with reference to the accompanying drawings, in which:

FIG. 18 is a table indicating the effects of different ways of partitioning the matching process.

Figure 1:
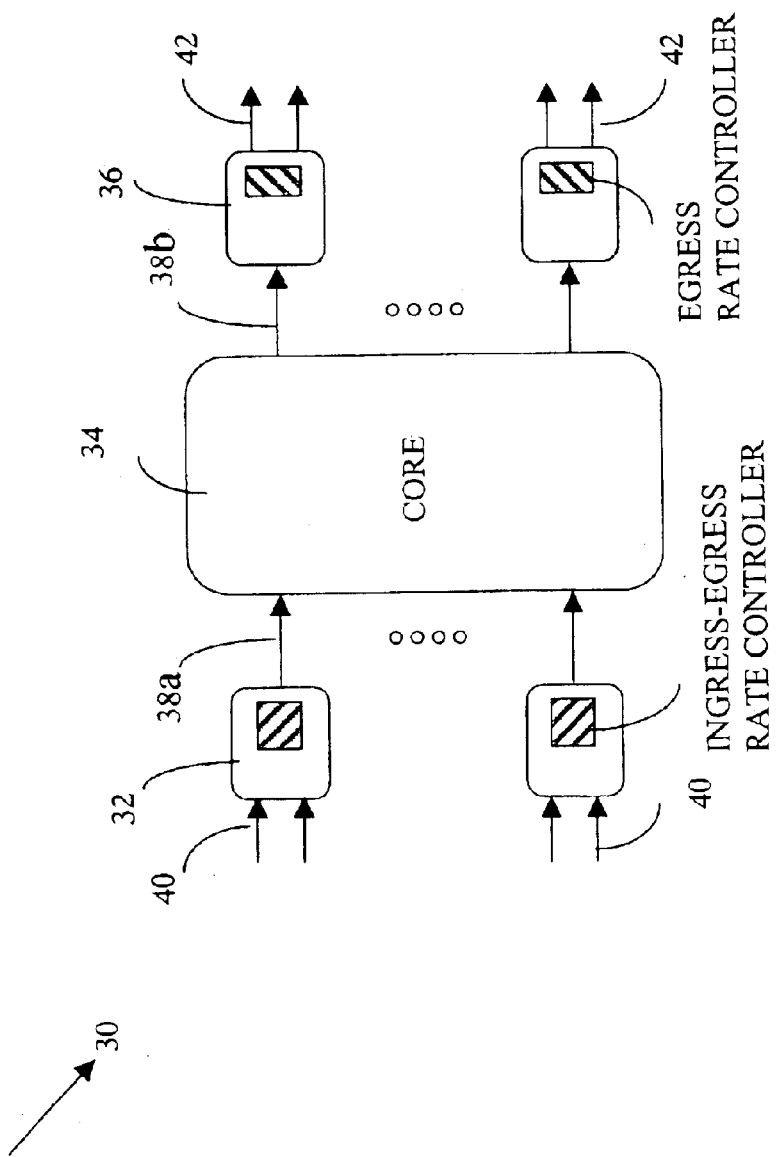
FIG. 1 is a schematic diagram of a three-stage packet switch showing ingress modules, egress modules, and an interconnecting core, with the ingress modules hosting the ingress-to-egress rate controllers, and the egress module hosting the egress rate controllers.

DEFINITIONS (1) Space Switch:
A switch without payload core memory that connects any of a number of input ports to any of a number of output ports under control of an addressing device.

(2) Rotator:
A clock-driven space switch that is much simpler to control than a space switch and easier to expand to accommodate a very large number of ports.

(3) Ingress Module:
A multiplexer connected to a switch core for receiving data from one or more incoming links.

(4) Egress Module:
A demultiplexer that receives data from a switch core and transfers the data through one or more egress links.

(5) Ingress Link:
A link that delivers data to an ingress module from one or more sources.

(6) Egress Link:
A link that delivers data from an egress module to one or more sinks.

(7) Inner Link:
A link connecting an ingress module to the core, or the core to an egress module.

(8) Rotator Period:
The time taken for any ingress module to access each core memory in a rotator-based switch. It is equal to the access interval multiplied by the number of ingress modules.

(9) Section:
A logical partition in a core memory of a rotator switch core. A section is capable of storing at least one parcel.

(10) Segment:
A data unit of a predetermined size, 1024 bits, for example, into which a packet of an arbitrary size is divided. A packet may be padded with null data in order to form an integer number of segments.

(11) Parcel:
An aggregation of a predetermined number of segments formed at an ingress module, each segment in the parcel being destined to egress from the same egress module.

(12) Time Slot:
The smallest time unit considered in the scheduling process, selected to be the time required to transfer a segment across an inner link between an ingress module and the switch core, or between the switch core and an egress module.

(13) Access Interval:
The time interval during which an ingress module accesses a core memory in a rotator-based switch core. Also, the time interval during which a parcel is transferred from an ingress module to an egress module in a space-core switch.

(14) Segmentation:
The process of dividing a packet into segments.

(15) Traffic Stream:
One or more segmented packets identified by an ingress port, egress port, and optionally a class of service distinction.

(16) Aggregation:
The process of grouping segments having a common egress module destination into parcels of predetermined capacity. A parcel is padded with null data if it is formed with fewer segments than the predetermined segment capacity of the parcel.

(17) Segmentation Waste:
Switch capacity waste resulting from null padding required to yield an integer number of segments from certain packets. Segmentation waste is expressed as a proportion of null data in segments transferred during an arbitrary observation period. A small segment size reduces segmentation waste but restricts the capacity limit of the switch. Normally, the segment length is limited by the extent of fabric parallelism in the switch core.

(18) Aggregation Waste:
The idle time spent in sending null data used to fill parcels. Aggregation waste is expressed as a proportion of null segments in parcels transferred during an arbitrary observation period. Aggregation waste can be reduced by imposing a parcel-formation rule that imposes a waiting period before an incomplete parcel can be transferred.

(19) Capacity:
A network entity (switch, link, path, or connection) dependent measure. The total bit rate that can be supported by the referenced entity.

(20) Committed Capacity:
Guaranteed service rate for a connection, usually expressed as the maximum permissible number of data units to be transferred in a predefined time period.

(21) Uncommitted Capacity:

The remaining capacity, if any, of a link after accounting for all capacity reservations.

(22) Unclaimed Capacity:

The difference, if greater than zero, between the permissible number of segments to be transferred in a specified time frame and the number of segments waiting to be transferred.

(23) Unused Capacity:

Sum of the uncommitted capacity and the unclaimed capacity.

(24) Diagonal Set:

A set of N ingress/egress module pairs, where N is the number of ingress or egress modules, selected such that each ingress module is encountered exactly once and each egress module is encountered exactly once in the set. There are N diagonal sets numbered 0 to N−1, where diagonal-set 0 includes ingress-egress pair (0, 0) and diagonal-set N−1 includes ingress-egress pair (0, N−1).

(25) Transfer Allocation:

The process of determining the number of segments to be transferred from an ingress module to an egress module during a predefined transfer allocation period. The product of the transfer allocation process is a matrix that stores the number of segments to be transferred from each ingress module to each egress module during a predefined transfer allocation period.

(26) Transfer Allocation Cycle:

A sequence of steps performed to determine a permissible number of segments to be transferred for each ingress/egress pair, during a selected transfer allocation period.

(27) Transfer Allocation Period:

A period of time allotted to perform the steps of a transfer allocation cycle. In a rotator-based switch, a transfer allocation period is preferably selected to be an integer multiple of a rotator period.

(28) Transfer Allocation Efficiency:

Ratio of the number of segments allocated by a transfer allocation device in a transfer allocation period and a theoretical number of segments that can be allocated during a transfer allocation period of the same length by an ideal transfer allocation device under the same traffic conditions.

(29) Service Rate:

The rate at which traffic is transferred through a network.

(30) Temporal Matching:

A process for determining, for an ingress/egress pair, time intervals in a predefined time-frame during which an ingress module and an egress module are available.

(31) Spatial Matching:

A process for determining available ingress and egress modules during a given access interval. In the space-core architecture, the egress-module has two states: busy and available. In the rotator-based architecture, the states of the egress modules are perceived by an ingress module during a given access interval as the number of parcels in each section of the accessed core memory, or the number of available parcel slots in each section.

(32) Scheduling:

The process of specifying the time intervals during which allocated segments are to be transferred from each ingress module without collision. The scheduling process is also called an assignment process.

(33) Scheduling Cycle:

A sequence of steps performed during a transfer allocation period to determine a time table for transferring a permissible number of segments for each ingress/egress pair.

(34) Scheduling Period:

A predefined time period for completing the assignment process for all ingress/egress module pairs. The scheduling period is preferably equal to the transfer allocation period.

(35) Scheduling Efficiency:

Ratio between the number of allocated segments scheduled by the scheduling device during a scheduling period and the theoretical number of allocated segments that can be scheduled by an ideal scheduling device during the same scheduling period using the same transfer allocation matrix.

(36) Standby Traffic:

Traffic streams, either connection-based or connectionless, with no service guarantees.

DETAILED DESCRIPTION OF THE PREFERRED EMBODIMENTS

This invention is related to switching packets of variable size. The objective is to switch the packets so that each packet leaves the switch in the same format in which it arrived at the switch. Traffic streams flowing through the switch are rate controlled from ingress to egress.

It is well known to transfer variable-sized data packets through backbone networks by segmenting the data packets into cells of fixed size at the network edges. Asynchronous transfer mode (ATM) works in this way. However, transferring variable-sized data packets across a network without segmentation into fixed-size cells simplifies traffic management across the network and avoids the network link capacity wasted by partially filled cells and the cell-header overhead.

In order to realize a switch of very-high capacity, of the order of tera-bits per second, a three-stage switch configuration may be used. A three-stage switch 30 is schematically illustrated in FIG. 1. A first stage comprises a number N, N>1, of ingress modules 32 and a third stage comprises a number M, M>1, of egress modules 36. A second stage is the core 34 of the switch 30, which interconnects the ingress modules 32 with the egress modules 36. Normally, the number of ingress modules 32 equals the number of egress modules 36. In a three-stage switch, the ingress and egress modules are paired.

Each ingress module 32 is connected to the core 34 of the switch 30 by a high-speed inner link 38*a*. The ingress module 32 may function as a buffered multiplexer if it supports several incoming links 40. The egress module 36 may function as a buffered demultiplexer if it supports outgoing links 42 of lower speed than the speed of an inner link 38*b* from the core 34 of the switch 30 to the egress module 36. Buffering at egress is also required to regulate the traffic rate to various network destinations. An egress module can be passive and bufferless if none of the outgoing links it supports has a speed less than the speed of the inner link 38*b* from the core 34 to the egress module 36, provided that rate-regulation is not applied to traffic streams flowing through the egress module. Each ingress module 32 must have at least a short ingress buffer regardless of the ratio of the speed of the incoming links 40 to the speed of the inner link 38*a* to the core 34. Incoming packets are buffered at the ingress module 32 because it may not be possible to transfer the data immediately to the core 34.

In order to facilitate the management of traffic within the switch 30, it is common practice to sort incoming packets. The incoming packets are sorted into the ingress buffers such that the packets are separated into traffic streams logically arranged according to the egress modules 36 from which the respective packets must egress from the switch 30. This facilitates the scheduling of traffic as described in U.S. Pat. No. 5,126,999, which issued to Münter et al. on Jun. 30, 1992. In the case of fixed-size cells, as in ATM switching, the ingress traffic may be sorted into a number of queues respectively corresponding to an egress module. In a switch 30 in accordance with the invention, variable-sized packets are internally divided into data units hereafter referenced as packet segments. The packet segments have a predetermined length to facilitate transfer within the switch 30.

Figure 2:
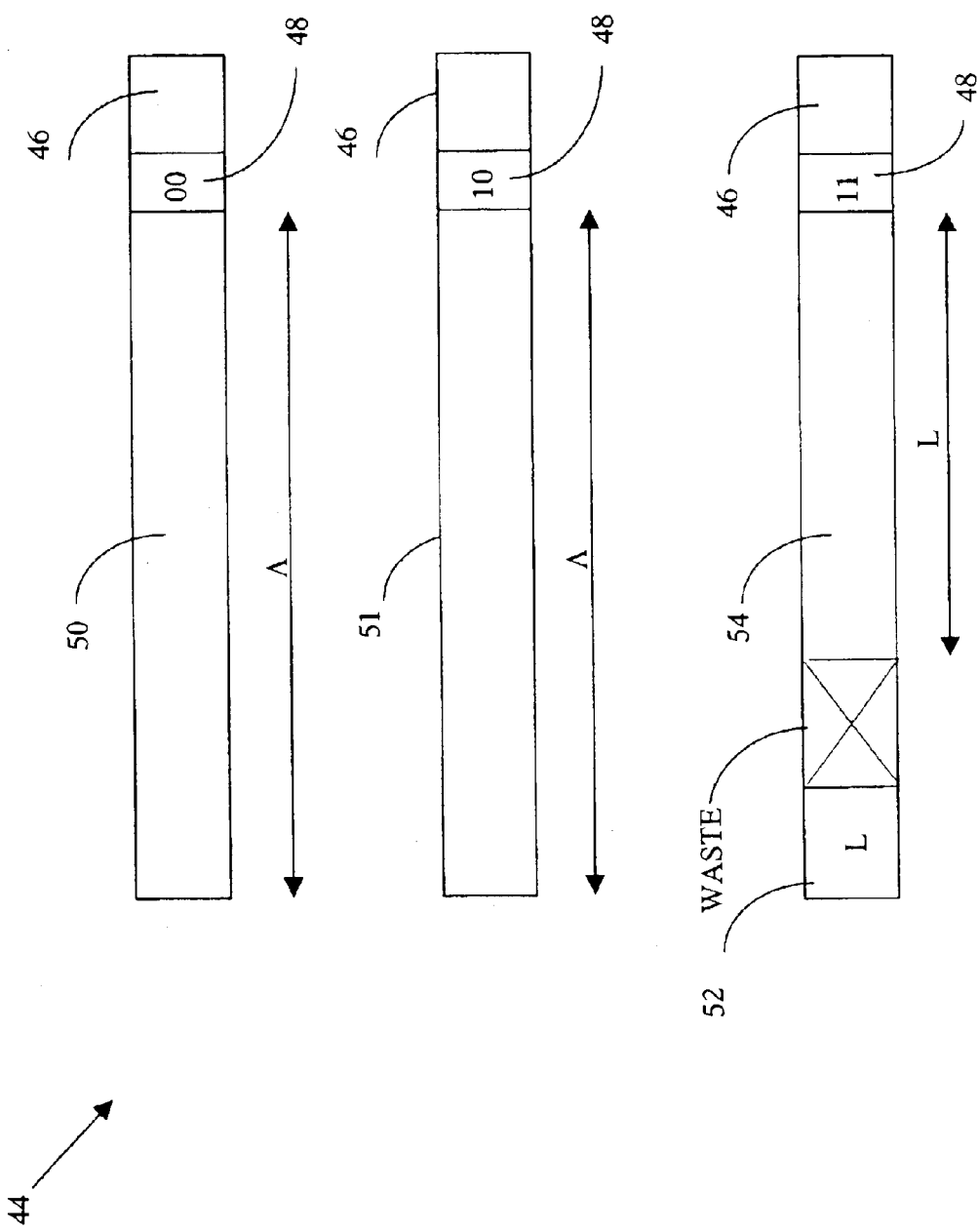
FIG. 2 shows the structure of a fixed-length segment of a packet of an arbitrary length, with an ingress-port identifier and a two-bit flag to indicate a last segment of a segmented packet.

FIG. 2 illustrates a preferred structure for packet segments 44. Packet segmentation enables switch simplicity at the expense of some waste of internal switch capacity. The packets are reconstructed before they exit the switch in order to avoid capacity waste in the links interconnecting the switches. In the switch architectures based on a space-switched core or a rotator-based core, the segments 44 of each packet are received at a respective egress module 36 (FIG. 1) in an order in which they were formed on ingress to the switch 30. However, the segments of any given packet may be interleaved with segments of other packets destined to the same egress module 36. In order to facilitate the re-assembly of packets, each segment is preferably labeled using a unique identifier 46 associated with an ingress module 32 at which the packet entered the switch 30. The unique identifier 46 associated with each ingress modules is preferably a sequential number, starting from 0 to N−1, for example, N being the number of ingress modules. By sorting the segments 44 at each egress module 36 according to the unique identifier 46, the segments 44 of any packet are juxtaposed in consecutive order in an egress buffer that corresponds to the packet's ingress module. The unique identifier 46 is stored in a first field of a header associated with each packet segment 44. Each packet segment 44 also carries a 2-bit flag 48 to identify the position of a segment in the packet. The 2-bit flag identifies a segment as either a continuation segment, a full-length last segment, or a last segment with null-padding. In the latter case, the number of bytes in the last segment must be indicated, preferably by storing the length in a last S-bits of a payload field, as will be explained below.

As shown in FIG. 2, each packet segment 44 has a two-field header. The first field contains the unique identifier 46 of a sufficient number of bits to identify the source module. The second field contains the 2-bit flag 48. If the flag is set to "00", the third field is a full payload segment 50, and other segments belonging to the same packet follow. If the flag is set to "10", the third field is also a full payload segment 51, but the segment is the last segment in a packet. If the flag is set to "11", the segment is the last segment in a packet and the segment is also a partial payload segment. The last S-bits 52 of the partial payload segment 54 indicate a length of the partial payload segment 54, as shown in FIG. 2, where $S \geq \log_2(\Lambda)$, $\Lambda$ being the number of payload bytes per segment. The length of the payload segment 50 is internally standardized, at 128 bytes for example. A packet is transferred to the network by the egress module only after its last segment, the segment with the last segment flag set to "10" or "11" is completely received. In order to simplify the scheduling process, the packet segments 44 are preferably transferred in parcels, with each parcel comprising a number of packet segments, four segments for example.

Figure 3:
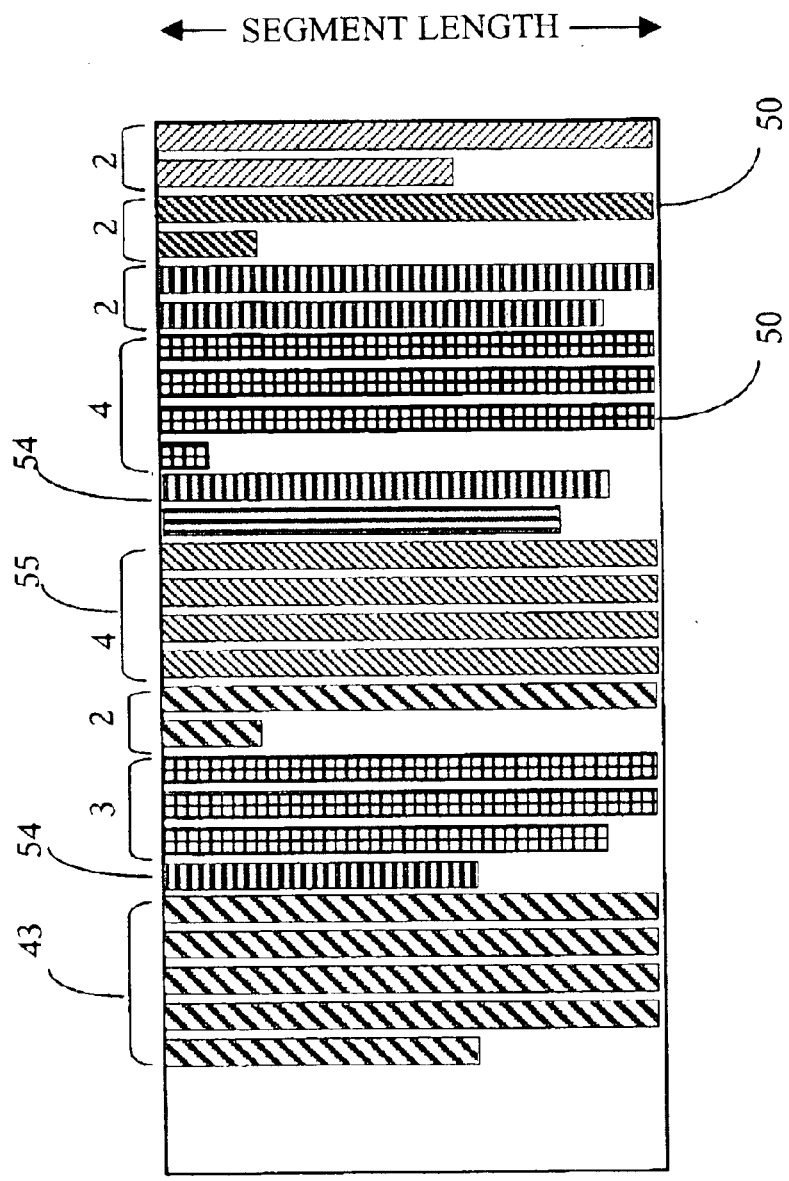
FIG. 3 shows a train of segmented packets of variable size, some of the segmented packets having last segments that are shorter than a full data segment.

FIG. 3 illustrates the packet segmentation process, showing the wasted capacity resulting from the partial segment 54 of most packets. The length of a packet may be a non-integer multiple of the length of the packet segments 44, or an integer multiple of a length of the packet segment as shown in packet 55.

Figure 4:
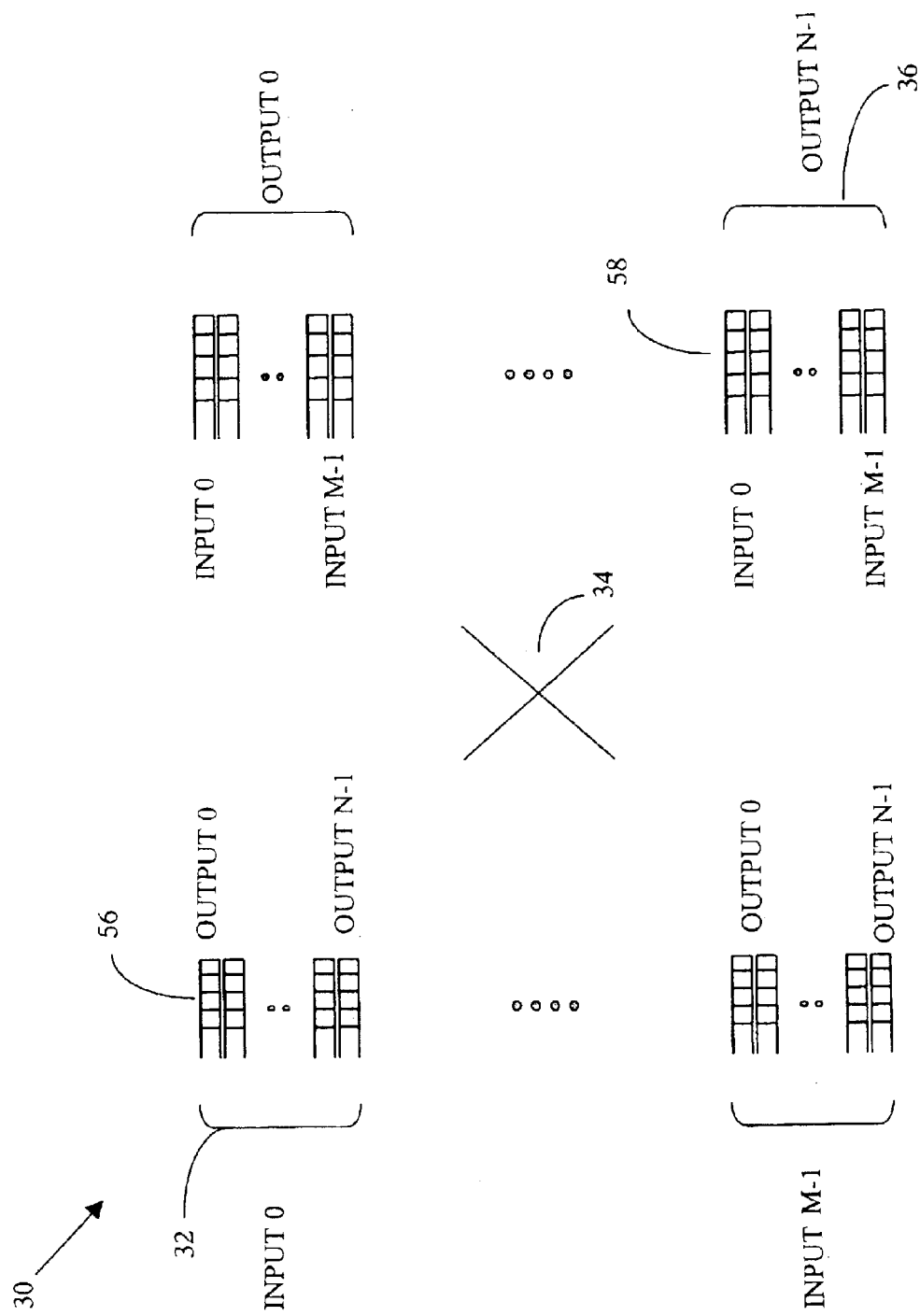
FIG. 4 illustrates the reciprocal ingress and egress sorting processes, where the packets are segmented at ingress and sorted according to egress module, and the segments transferred to the egress modules are sorted according to ingress module.

FIG. 4 illustrates the reciprocal sorting process in accordance with the invention. As each packet arrives at the switch 30, the packet 43 is divided into packet segments 44 by the ingress module 32, as described above. The packet segments 44 are then sorted into ingress buffers 56, each of which corresponds to an egress module 36 from which the packet is to egress from the switch. At each egress module 36, the segments are sorted into egress buffers 58 according to their unique identifier 46 (FIG. 2). Other sorting schemes which, for example, are based on additional factors such as quality of service (QoS) distinctions may also be implemented.

Switch Architecture

Figure 5:
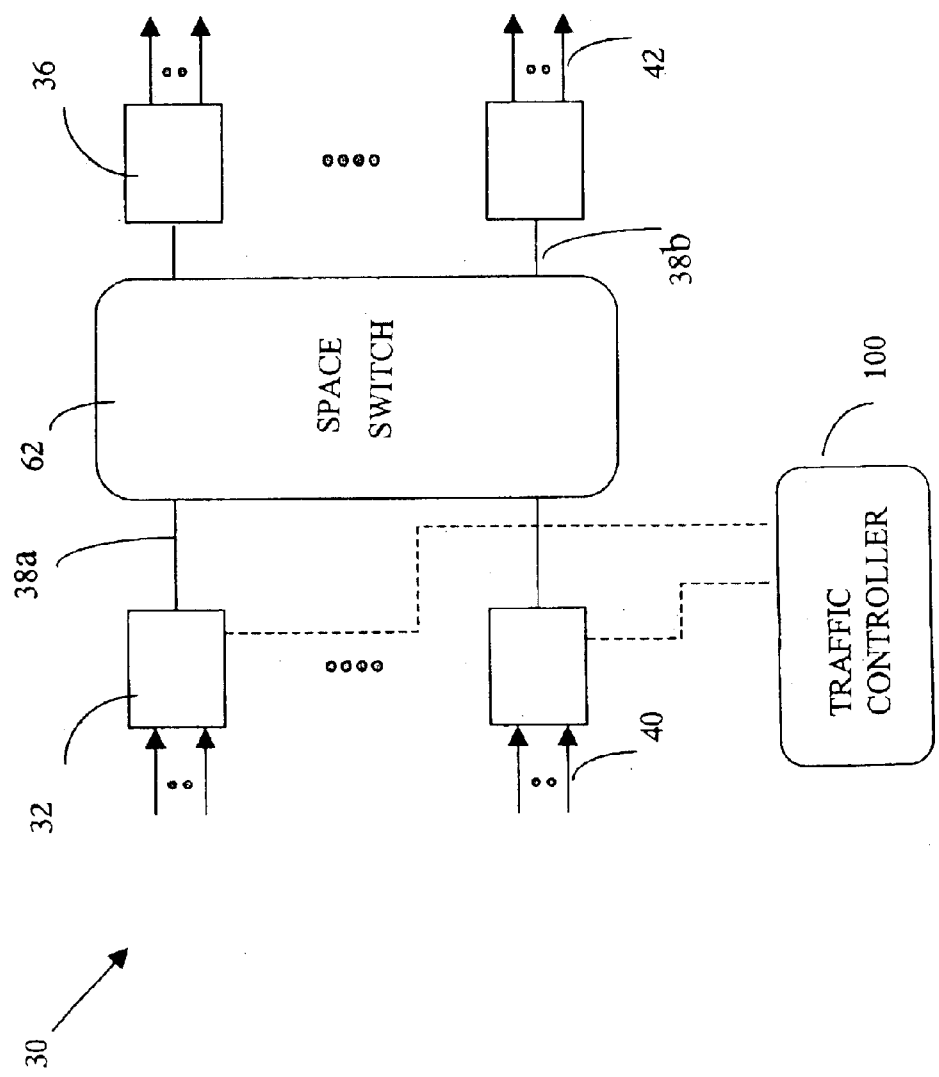
FIG. 5 is a schematic diagram of a packet switch with a space-core and a traffic control mechanism in accordance with the invention.

The two switch core architectures, space-core and rotator-based, referred to above have many characteristics in common. The first uses a space-switch stage in the core and is hereafter referenced as a "space-core switch". The second uses a core stage comprising two rotators and a bank of core memories and is hereafter referenced as a "rotator-based switch". The rotator-based switch has a simpler control mechanism and has a higher capacity upper bound. Using either core architecture, a path of dynamically variable capacity can be established between each ingress module and each egress module. FIG. 5 illustrates the space-core architecture. The switch 30 includes a space-core 62 that switches packet segments 44 between the ingress modules 32 and the egress modules 36. Each ingress module 32 communicates information to a traffic controller 100. The information is related to a traffic load and committed capacity (service rate) for traffic to be switched to each of the respective egress modules 36. The respective committed ingress/egress capacities are established by a switch controller (not illustrated) that is responsible for traffic admission control. Packet segments 44 are transferred to the core 62 from the ingress modules 32 via inner links 38a and from the core to the egress modules 36 via inner links 38b.

Figure 6:
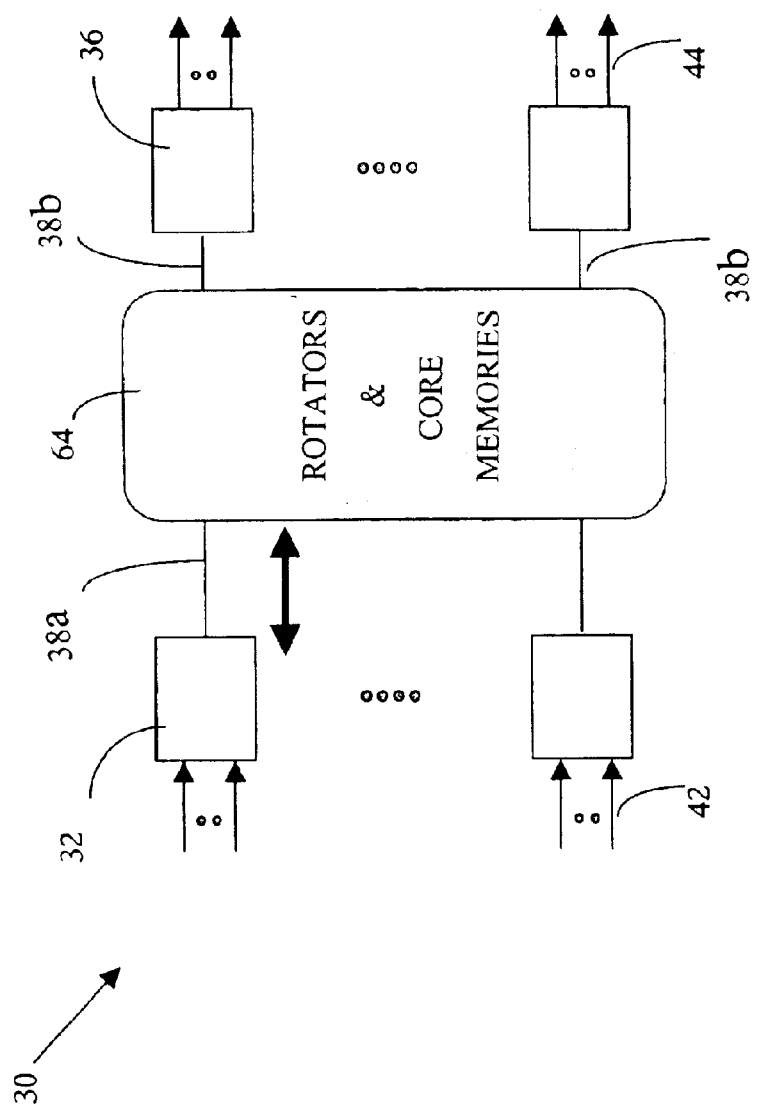
FIG. 6 is a schematic diagram of a rotator-based switch in which each ingress module may independently transfer its segments to their respective egress modules.

FIG. 6 schematically illustrates a switch 30 that is constructed using the rotator switch architecture. The switch 30 shown in FIG. 6 is quite similar to the space-core switch shown in FIG. 5. The space-switched core 62 is replaced by a rotator core that consists of two rotators 63 (FIG. 7) and a bank of parallel core memories 66 that in combination constitute a rotator-based core 64. The switch architecture shown in FIG. 6 does not require a central traffic controller. However, central control can be optionally used to improve utilization of the switch 30.

Figure 7:
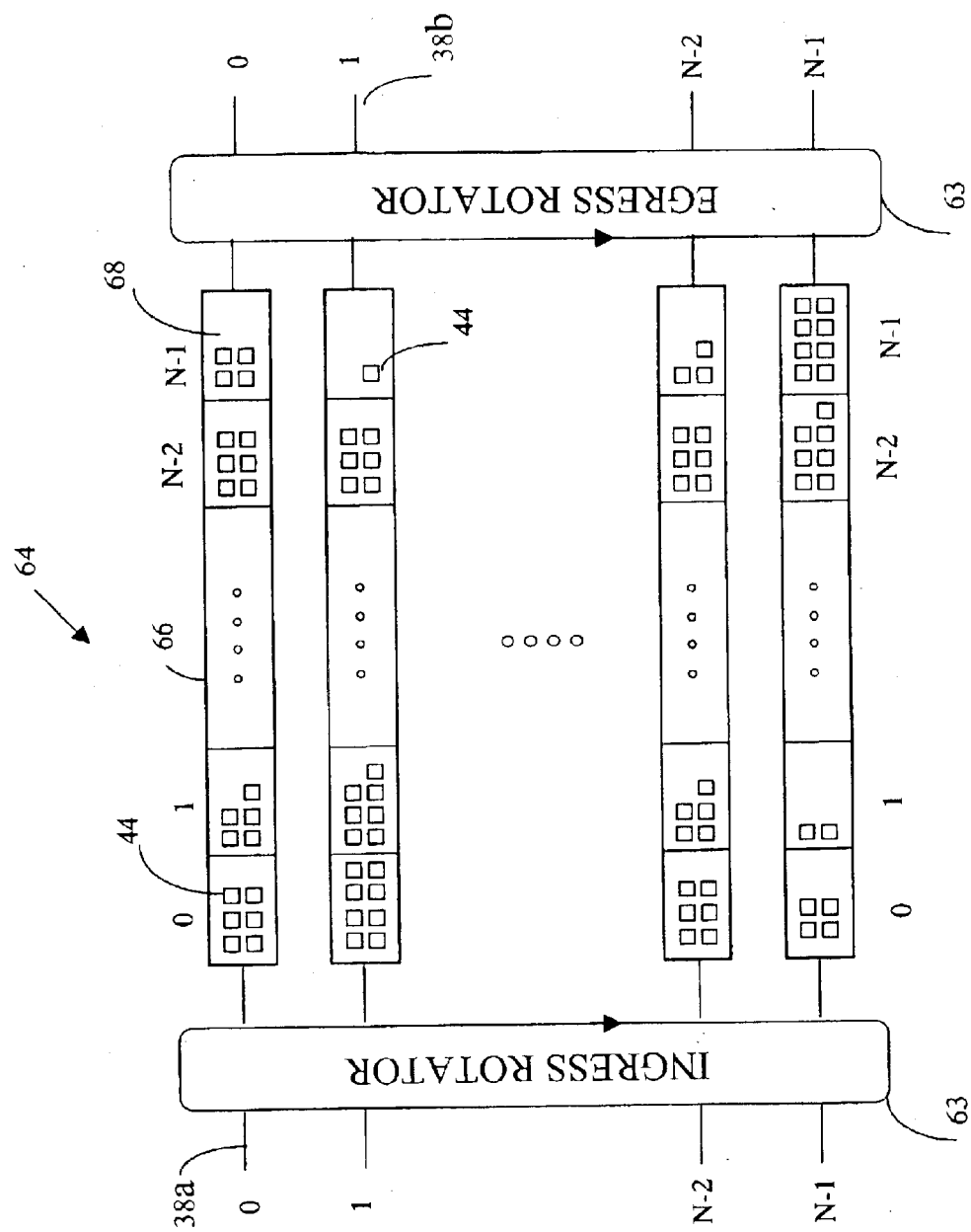
FIG. 7 shows a more detailed view of a rotator-based switch core.

FIG. 7 illustrates in more detail the core 64 of the rotator-based switch shown in FIG. 6. There are N core memories 66, each of which is logically partitioned into N sections 68, each section 68 being implicitly associated with an egress module and adapted to store a predetermined number K, 8 for example, of packet segments 44. Each inner link 38a that interconnects an ingress module 32 (not shown) to a rotator port (not shown) accesses each core memory 66 during a rotator cycle. The access duration is at least sufficient to transfer the predetermined number of packet segments K to the accessed memory section 66. The K packet segments 44 need not belong to the same packet 43 or to the same egress module 36, i.e., the packet segments 44 may be transferred to different sections 68 of the core memory 66. However, a given packet segment 44 can only be transferred to a memory section 68 that corresponds to an egress module 36 from which the packet 43, to which the packet segment belongs, is to egress from the switch 30.

Figure 8:
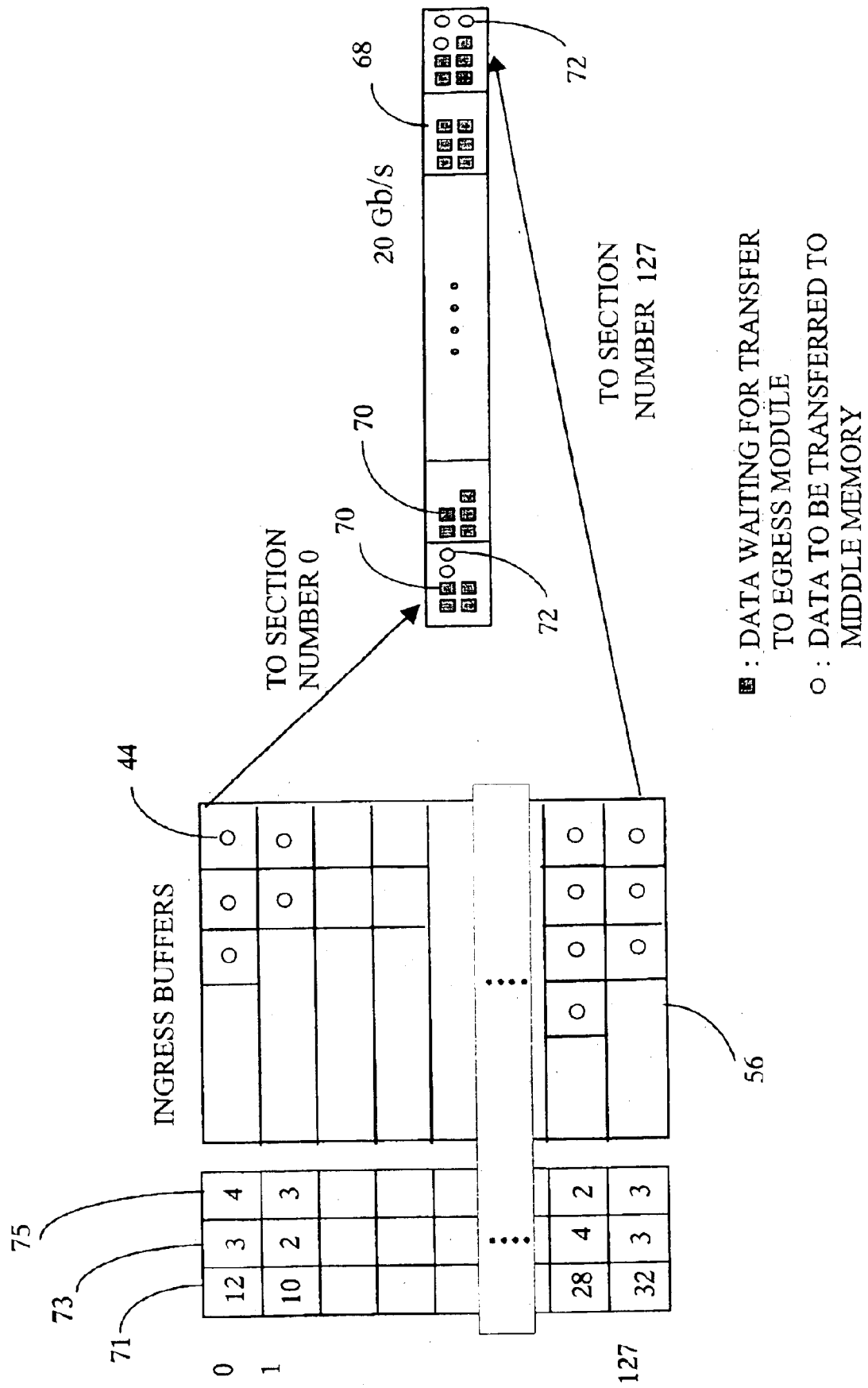
FIG. 8 illustrates a process in a rotator switch in which an ingress module independently writes packet segments to corresponding vacancies in a core memory, the number of transferred segments being limited by predetermined transfer allocations.

FIG. 8 illustrates the transfer of packet segments from an ingress buffer 56 of an ingress module 32 to an accessed core memory 66 in accordance with a first embodiment of the invention. In the example shown, at most eight packet segments 44 are permitted to be transferred during the access interval (K=8). The squares 70 shown in the core memory 66 represent packet segments 44 already transferred by other ingress modules 32, and not yet read by the respective egress modules 36. The circles 72 shown in the core memory 66 indicate the packet segments 44 transferred to a given memory section 68 during the illustrated access interval. This transfer process is referred to as "heterogeneous segment transfer". The computation of the transfer allocations will be described below in more detail.

Figure 9:
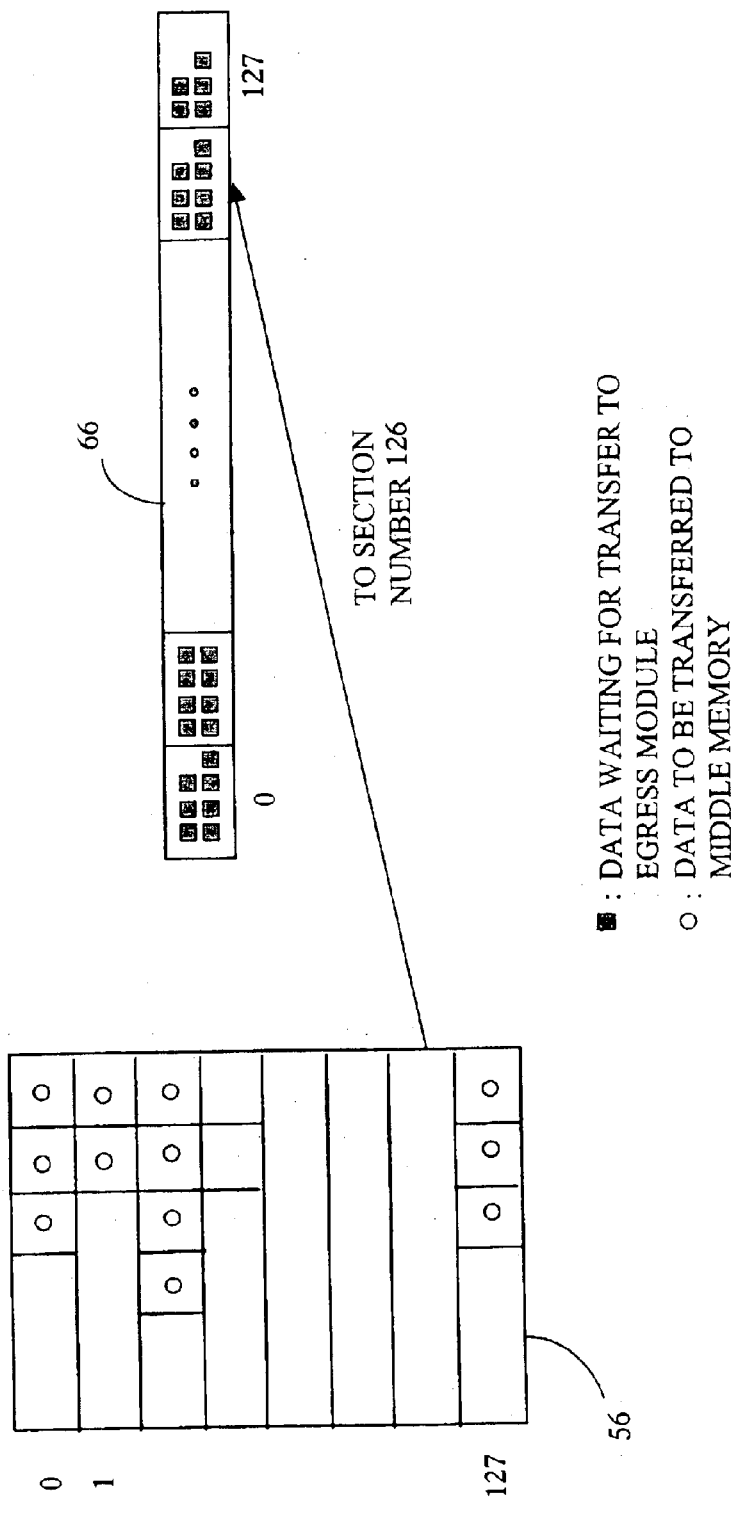
FIG. 9 shows a process similar to that shown in FIG. 8 except that segments may only be written to a single memory location during a rotator cycle.

FIG. 9 shows a simpler implementation, referred to as "homogenous segment transfer", of the process schematically illustrated in FIG. 8. In homogenous segment transfer, segments may only be transferred to a single core memory section 68 (i.e., to a single egress module 36) during an access interval. This implementation is simpler but is less efficient because there are occasionally insufficient packet segments 44 in any given ingress buffer 56 to fill an entire core memory section. Utilization is improved with heterogeneous segment transfer in which the transferred segments are written to several memory sections 68. The procedure illustrated in FIG. 9 simplifies the scheduling process at the expense of a reduced throughput. The throughput can be improved by introducing an acceptable delay between ingress and transfer to a core memory. This will be described below with reference to FIG. 11.

Figure 10:
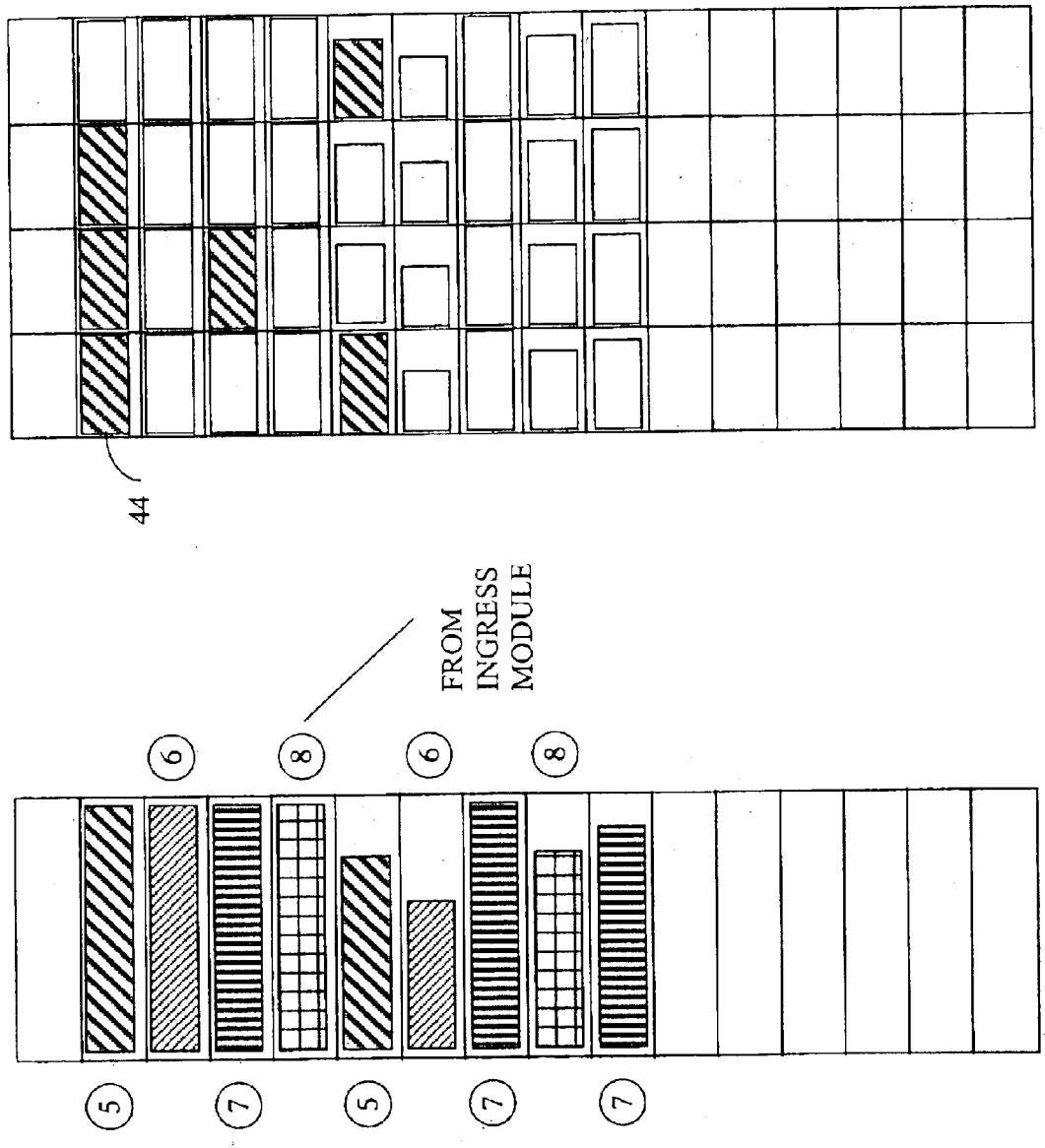
FIG. 10 illustrates segment interleaving during normal operation of a rotator-based switch.

FIG. 10 schematically illustrates the interleaving of packet segments 44 in the core memory of a rotator-based switch. The column on the left side (a) of FIG. 10 is an illustration of an implementation in which each section in a core memory can hold only one segment. The right side (b) of FIG. 10 illustrates an implementation in which a core-memory section can hold four segments. The segments of a packet destined to an egress-module Y may be transferred to sections bearing the same egress-module designation Y but in different core memories. The packet segments 44 belong to different packets 43 that are respectively to egress from the same egress module 36. In the example shown, in FIG. 10(a) packet segments 44 from four ingress modules identified by the numbers 5–8 are interleaved in the core memory. Similar interleaving takes place due to scheduling conflicts in the architecture of the spacecore switch 62. In a space-core switch 62, a matching process is required between the ingress side and egress side of the switch. The problem of matching in multistage switches had been extensively studied and reported in the literature over several decades. It is well known that matching consecutive slots is difficult to realize and successive segments sent by a given ingress module may have to be transferred during non-adjacent time slots. Consequently, the packet segments 44 arrive at an egress module interleaved by packet segments transferred from other ingress modules. The unique identifier 46 (FIG. 2) stored in the segment header permits the segments to be sorted into egress buffers so that the packets may be reassembled in the same condition in which they entered the switch 30. The packet segment interleaving shown in FIG. 10 therefore does not present a problem in a switch in accordance with the invention.

Aggregation

The scheduling process can be simplified by aggregating segments into parcels, and controlling the transfer of parcels to the core. In the space-core switch, an ingress module is connected to one egress module during an access interval, and a guard time may be required between successive access intervals. Preferably, therefore, data should be transferred in parcels and each parcel should have a sufficient number of segments to reduce the relative guard-time overhead. A guard time is also needed in the transition between successive core memories in a rotator-based switch. In the rotator-based switch, the number, K, of segments that can be transferred during an access interval is selected to be large enough to reduce the relative waste due to the idle time during transition between successive core memories, and small enough to reduce the rotator-cycle duration. The rotator cycle duration is the product of the access interval and the number of core memories 66. The access interval is determined as $D=(K+\kappa) \times d$, were $\kappa$ is the number of idle slots resulting from the transition between core memories, and d is a segment transfer time. With K=16, d=25 nanoseconds, $\kappa=2$, and N=128, for example, the access interval D=0.45 microseconds, and the rotator period is 57.6 microseconds. The K segments transferred in an access interval may be destined to egress from several different egress modules. This increases the computational effort required for scheduling. As explained above, scheduling can be simplified by aggregating segments into parcels, the number q of packet segments per parcel may be greater than 1 and less than or equal to K. In the above example, a parcel may have 4 segments, and the maximum number of matching egress destinations to be found during an access interval is reduced from K=16 to m=K/q=4.

The packet segments in a parcel may belong to different packets but must be destined to egress from the same egress module. As discussed above, the traffic at each ingress module is sorted into logical buffers according to the egress-module from which it is destined to egress. The parcel formation process must attempt to increase efficiency by ensuring that most parcels are full. This may be difficult to achieve, however, under severe spatial imbalance in traffic load. To circumvent this difficulty, parcels are formed from an ingress buffer only when the number of segments in the buffer equals or exceeds the parcel size, q, or if the waiting time of the head-of-buffer segment has reached a predetermined threshold. The larger the threshold the lower the rate of transfer of incomplete parcels and, hence, the higher the aggregation efficiency.

The aggregation efficiency depends on the spatial and temporal distribution of the traffic, which is difficult to quantify in real time. The highest aggregation efficiency is realized when all the traffic arriving at an ingress module is destined to egress from a single egress module. A high efficiency may also be realized with a reasonable delay threshold if the traffic is spatially balanced. Aggregation efficiency decreases significantly in a worst case in which a very large proportion of the traffic arriving at an ingress module is destined to egress from a single egress module and the remainder is distributed evenly among all other egress modules. To quantify this worst case, the threshold is expressed as an integer multiple, T, of an access interval D. During the T access intervals, one of the sorted logical buffers is almost always ready to form complete parcels while each of the remaining N−1 logical buffers contains only one segment each. At the expiry of the delay threshold N−1 parcels must be formed, each containing only one packet segment while the rest of the parcel is padded with null segments. The computation of the aggregation efficiency under these conditions will be described below and used to quantify an internal capacity expansion to offset the effect of null padding.

Aggregation Device

At ingress, arriving packets are segmented as described above and the segments are grouped into logical buffers according to egress-module destination. The segments may also be further separated into traffic streams according to class of service. Segments of the same ingress, egress, and class of service are said to form a traffic stream. A service rate may be allocated to each traffic stream at the ingress module. The sum of the service rates allocated to the traffic streams of different classes of service, but of the same ingress-egress pair, is reported to a central rate-allocation device.

If it is decided to aggregate the segments into parcels, in order to simplify the scheduling process, as described earlier, steps should be taken to minimize the aggregation waste. A simple rule is to permit parcel formation only when there are enough segments to fill a parcel, or when a delay threshold is reached. The delay threshold may vary according to class of service. The size, q, of a parcel (the maximum number of segments per parcel) is a design parameter.

Figure 11:
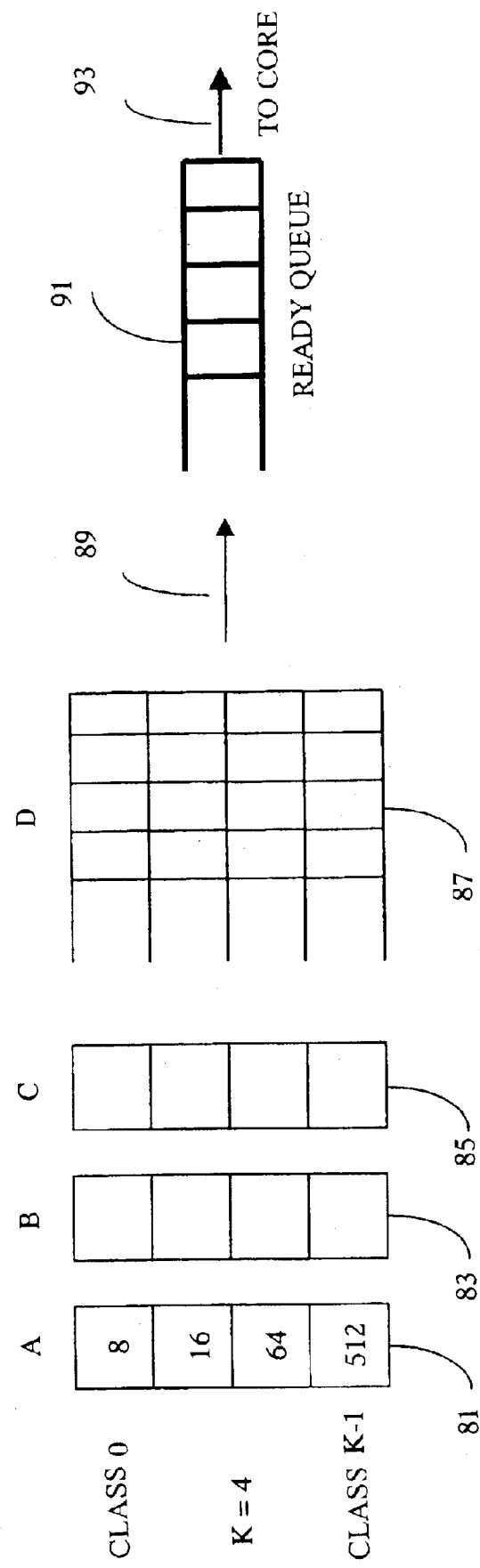
FIG. 11 schematically illustrates a segment aggregation device based on packet age, size, and class of service.

FIG. 11 shows an aggregation device for aggregating packet segments for a given destination belonging to four classes of service. The aggregation device comprises a memory 81 for storing a delay threshold for each class of service, a memory 83 for storing a time-stamp for each class of service, and a memory 85 for storing the number of waiting segments per class of service. The segments are stored in a memory 87 which is logically partitioned into Q queues, Q being the number of classes of service. The delay thresholds are determined according to the delay tolerance of different classes of service. In the example of FIG. 11, with Q=4, the delay threshold varies from 8 time units, for a delay sensitive class of service, to 512 time units, for a delay-tolerant class of service. The respective delay tolerances are stored in the delay threshold memory 81.

When a segment of class j is generated at an ingress module, it is stored in memory 87 in a respective $j^{th}$ logical queue, and the corresponding entry in memory 85 is increased by 1. If the $j^{th}$ entry $0 \leq j < Q$ in memory 85, modulo q, is equal to 1, the $j^{th}$ entry in memory 83 is overwritten by the current clock. Thus, an entry in memory 83 always indicates the birth date of a critical segment which determines the eligibility of transfer of trailing segments in the respective segment queue in memory 87. The clock time is cyclical. The length of the clock cycle is determined according to the largest delay threshold.

Entries 0 to Q−1 in memory 83 and memory 85 are read cyclically to determine when waiting segments, if any, may be (logically) transferred from memory 87 to a ready queue 91, using a round-robin selector 89. Parcels are formed directly from the ready queue 91, and a parcel may contain segments of different classes. The scanning interval, i.e., the time taken to read and process the entries relevant to any of the Q classes, is preferably shorter than a segment transfer time. During a scanning interval, corresponding to class j, $0 \leq j < Q$, the following process is performed:

If the $j^{th}$ entry in memory 85, storing the segment count for class j, equals or exceeds q, q of the waiting segments stored in the $j^{th}$ logical queue in memory 87 are logically entered in the ready queue 91 and the segment count in memory 85 is reduced by q. If the remainder is not less than q, the process is repeated. Otherwise, the scanner moves to the following class.

If the $j^{th}$ entry $0 \leq j < Q$ in memory 83 indicates a delay exceeding the threshold for class j, the waiting segments in the $j^{th}$ segment buffer in memory 87 are logically transferred to the ready queue 91, the corresponding entry in memory 85 is reset to zero, and the scanner moves to the following class.

It is noted that when a segment is logically transferred from memory 87 to the ready queue 91, the respective segment-queue size, indicated in memory 85, is reduced despite the fact that the segments will actually be removed from memory 87 upon de-queuing from the ready queue 91 at a later time. During an access interval, the ready queue 91 transfers to the core q segments or all waiting segments, whichever is less, via data links 93.

Transfer Allocation and Traffic Scheduling

There are two crucial steps that determine the performance and throughput of the switch 30 in accordance with the invention. The first is the adaptive allocation of ingress/egress path capacity, referred to as "transfer allocation". The second is the scheduling of transfer times for allocated packet segments waiting to be transferred from the ingress modules 32 to the core 34 of the switch 30, referred to as "transfer assignment".

Figure 12:
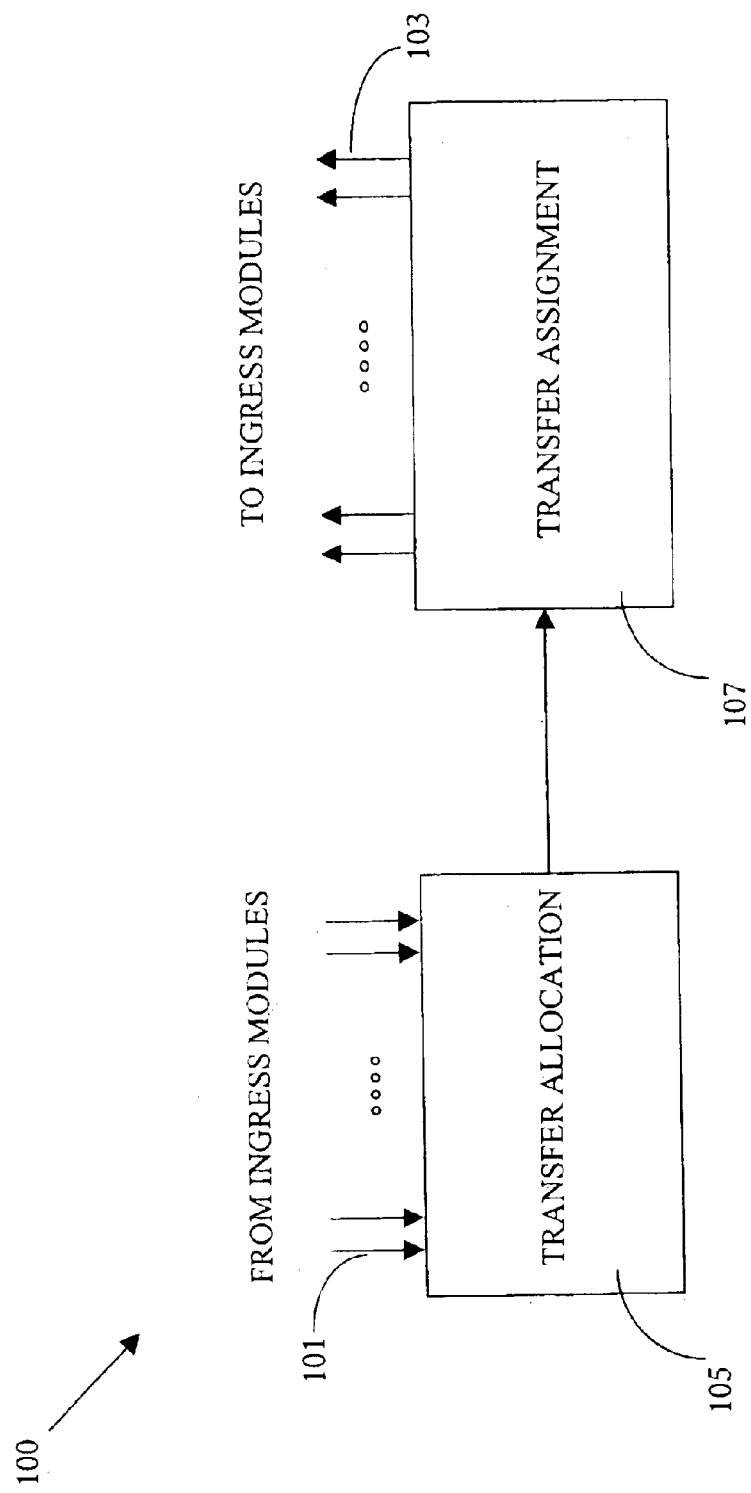
FIG. 12 illustrates a two-stage control system required to effect segment transfer under rate control, the control system including an ingress/egress transfer allocation mechanism and an ingress/egress transfer mechanism.

FIG. 12 schematically illustrates the process of transfer allocation and transfer assignment. In the transfer allocation process, the number of parcels that each ingress module 32 is permitted to transfer to each egress module 36 during a specified transfer allocation period is determined. The length of a transfer allocation period is determined based on architectural considerations in a manner well known in the art. The transfer assignment process is the implementation of the transfer allocation process. Two methods for effecting the transfer assignment process will be described. In accordance with a first method, the transfer assignment process is localized in each ingress module. This is referred to as the "distributed transfer assignment process". This method is suitable for the rotator-based switch architecture. Accordingly, an ingress module 32, which may have packets to be transferred to several different egress modules 36, selects core memory sections 68 corresponding to one or more of the egress modules without coordination with other ingress modules. In accordance with the second method, a central controller schedules the data transfer for all ingress/egress pairs during each scheduling cycle. This is referred to as the "centralized transfer assignment process".

FIG. 12 illustrates an arrangement in which a transfer allocation mechanism 105 receives traffic data from the ingress modules 32 via data links 101. The transfer allocations are either distributed directly to the ingress modules 32 to perform distributed transfer assignment, or communicated to a transfer assignment mechanism 107. The duration of the transfer allocation cycle is switch-architecture dependent. In a space-core architecture, the duration of the transfer allocation cycle is arbitrary. However, the duration of a transfer allocation cycle should be long enough for the computational circuitry to complete required computations, yet short enough to closely follow variations in traffic volume or composition. In the rotator-based architecture, the transfer allocation cycle may also be of arbitrary duration, however, it is advantageous to set the duration of the transfer allocation cycle to an integer multiple of the rotator period. The rotator period is the time taken for an ingress module to visit each core memory 66 in the core 64 (FIG. 7). For example, if there are 128 core memories 66 in core 64, and if the access interval required for an ingress module to visit a core memory 66 in core 64 is 0.50 microseconds, then the rotator period is 0.50×128=64 microseconds. If the transfer allocation cycle is selected to be an integer-multiple of the rotator period, the transfer allocation cycle preferably has a duration in microseconds of 64, 128, 192, etc.

Determining the Unused Capacity

The admission-control mechanism (not shown), whether based on predictive or adaptive methods, ensures that the committed rates for the traffic streams under its control do not exceed the available capacity. Standby traffic may coexist with rate-controlled traffic and exploit the fluctuating unused capacity, which comprises the uncommitted capacity and the capacity unclaimed by the rate-regulated traffic.

Figure 13:
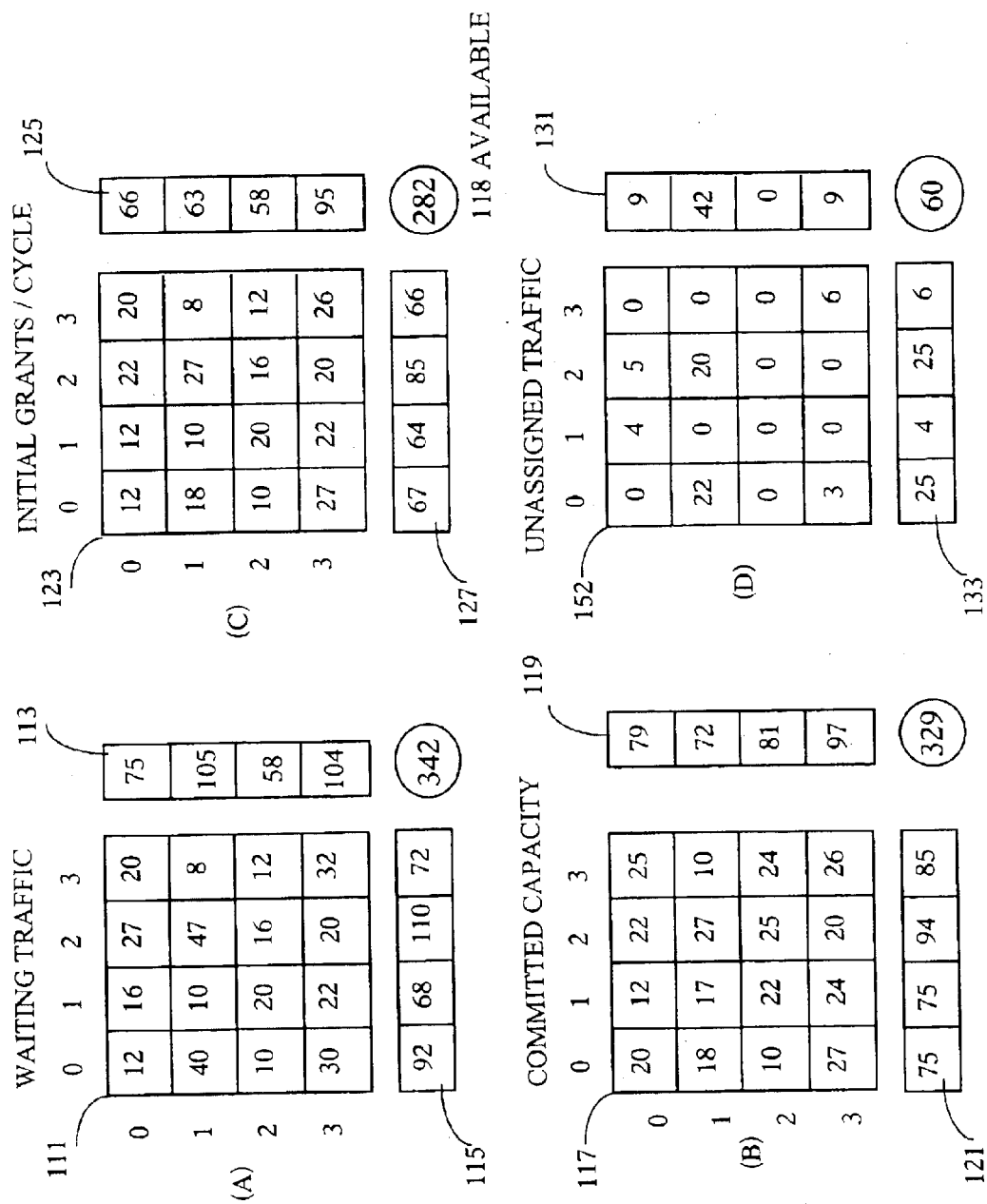
FIG. 13 illustrates a procedure used by the ingress/egress transfer allocation mechanism to determine committed capacity allocations for ingress/egress module pairs.

The transfer allocation process is described with reference to FIG. 13, which illustrates an example of a switch of four ingress modules 32 and four egress modules 36. The type of switch core 34 used between the ingress modules and the egress modules is irrelevant to this process. The capacity of the inner link 38a (FIG. 1) from each ingress module 32 to the core 34, and the capacity of the inner link 38b from the core 34 to each egress module 36 are equal. Each inner link has a nominal capacity of 100 packet segments per transfer allocation cycle in this example.

A matrix 111 stores the number of waiting packet segments 44 for each ingress/egress pair. This matrix is assembled from data communicated during each transfer allocation cycle by the individual ingress modules 32 to the transfer allocation mechanism 105 shown in FIG. 12. The data is communicated through data links 101 as described above. Each ingress module communicates a respective row in matrix 111. Array 113 and array 115 are shown for purposes of illustration only and are not necessarily maintained by the transfer allocation mechanism 105. Array 113 shows the total number of packet segments waiting at each ingress module 32, and array 115 shows the number of packet segments destined to each egress module 36.

Matrix 117, used by the transfer allocation mechanism, stores the committed capacity (guaranteed minimum capacity) for each ingress/egress pair. The committed capacity is the result of one of several admission-control mechanisms such as: (1) explicit specifications received through the incoming links 40 (FIG. 5) feeding the ingress modules 32; (2) an equivalent-rate computation based on traffic descriptors; (3) predictive methods based on short-term traffic projection; or, (4) adaptive observation-based specifications. Each of these mechanisms is known in the art. An array 119 shows a total committed capacity of each ingress module and an array 121 shows the total committed capacity for each egress module. Arrays 119 and 121 are shown for purposes of illustration only, they are not required by the transfer allocation mechanism 105 (FIG. 12).

Matrix 123 shows the minimum number of packet segments to be transferred per transfer allocation cycle by each ingress/egress pair based on initial grants by the transfer mechanism 105. Arrays 125 and 127, shown for purposes of illustration only, respectively store the total initial grant for each ingress module 32 and each egress module 36. Each entry in matrix 123 is the lesser of the values of corresponding entries in matrices 111 and 117. For example, there are twenty-seven packet segments waiting at ingress module 0 that are to egress from the switch 30 at egress module 2. The committed capacity for ingress/egress pair (0, 2) is 22 according to matrix 111. Initially, in a first step, ingress/egress pair (0, 2) is allocated 22 packet segments per allocation cycle as indicated in matrix 123. This allocation may be increased in subsequent steps of the allocation process, as will be described below. Ingress/egress pair (2, 3) has 12 packet segments waiting while the committed capacity is 24 packet segments. The entry (2, 3) in matrix 123 is 12 and the extra 12 packet segments are available for potential use by other ingress/egress pairs having module 2 as the ingress or module 3 as the egress module. Thus, the purpose of constructing matrix 123 is to facilitate adaptive capacity sharing. Capacity sharing is realized by distributing unused capacity. Matrix 152 stores the waiting excess traffic, i.e., the number of waiting packet segments that exceeds the committed ingress/egress allocations. This excess traffic is treated as standby traffic. Arrays 131 and 133, shown for illustration purposes only, store the excess (standby) traffic aggregated per ingress and egress, respectively.

Allocation of Unused Capacity

In order to increase the efficiency of the switch and facilitate the transfer of connectionless traffic through the network, a switch in accordance with the invention allocates unused switch capacity to the ingress modules to permit the transfer of waiting packet segments 44. This allocation may be accomplished using either a traffic-independent distribution method, or a traffic-dependent distribution method. The traffic-independent method is less computationally intensive and therefore simpler to implement. The traffic-dependent method is more computationally intensive but it is more efficient. Each method is described below.

Traffic-Independent Distribution of Unused Capacity

Traffic-independent distribution of unused switch capacity is accomplished using a matrix 140 that stores the excess capacity of a switch in accordance with the invention consisting of four ingress modules 32 and four egress modules 36. An array 143 stores the excess ingress capacity of each ingress module 32. The excess ingress capacity is a sum of the uncommitted ingress capacity plus the currently unused portion of the committed capacity of each ingress module 32. As described above, the committed capacity of each link served by an ingress module is determined by admission control, which admits each connection-based session with a committed ingress-to-egress capacity for the connection. The unused (excess) capacity for ingress and egress modules is stored in arrays 143 and 145 respectively. Array 143 is derived from array 125 where each entry in array 143 equals 100 minus its counterpart in array 125. Array 145 is derived from array 127 in a similar manner. The nominal inner-link capacity is 100 units in this example, as described above.

A simple way to distribute the excess capacity is to use a "gravity" approach, in which the transfer allocation for each ingress/egress pair is proportional to a product obtained by a multiplication of the excess capacity at ingress (array 143) (multiplicand X) and the excess capacity at egress (array 145) (multiplicand Y). The product is divided by the total excess capacity. The total excess capacity 149 is obtained by summing either of the excess ingress capacity (array 143) or the excess egress capacity (array 145)

This process is traffic-independent and requires $N^2$ computations, each computation being a multiplication followed by a division. The $N^2$ division operations can be reduced to N division operations by initially dividing one of the multiplicands, X (array 143) or Y (array 145), by the total excess capacity 149. In doing so, one of the multiplicands is modified by left-shifting by 'B' bits, B being an integer greater than 8, 10-bits for example (equivalent to multiplying by 1024) before the division. The result of pair-wise multiplication of elements of array 145 and the modified array 143 (or elements of array 143 and a modified array 145) is then right-shifted the same B bits, 10-bits in this example (equivalent to division by 1024) with rounding. The result is the number of packet segments that is allocated for transfer to each ingress/egress pair. The above process can use as many parallel multiplication units as practically feasible, since the $N^2$ multiplications are independent of each other. The sum of the entries in a row in matrix 141 may be less than a respective entry in array 143 due to rounding. A column sum in matrix 141 may differ from a respective entry in array 145 for the same reason.

Traffic-Dependent Allocation of Unused Capacity

Figure 15:
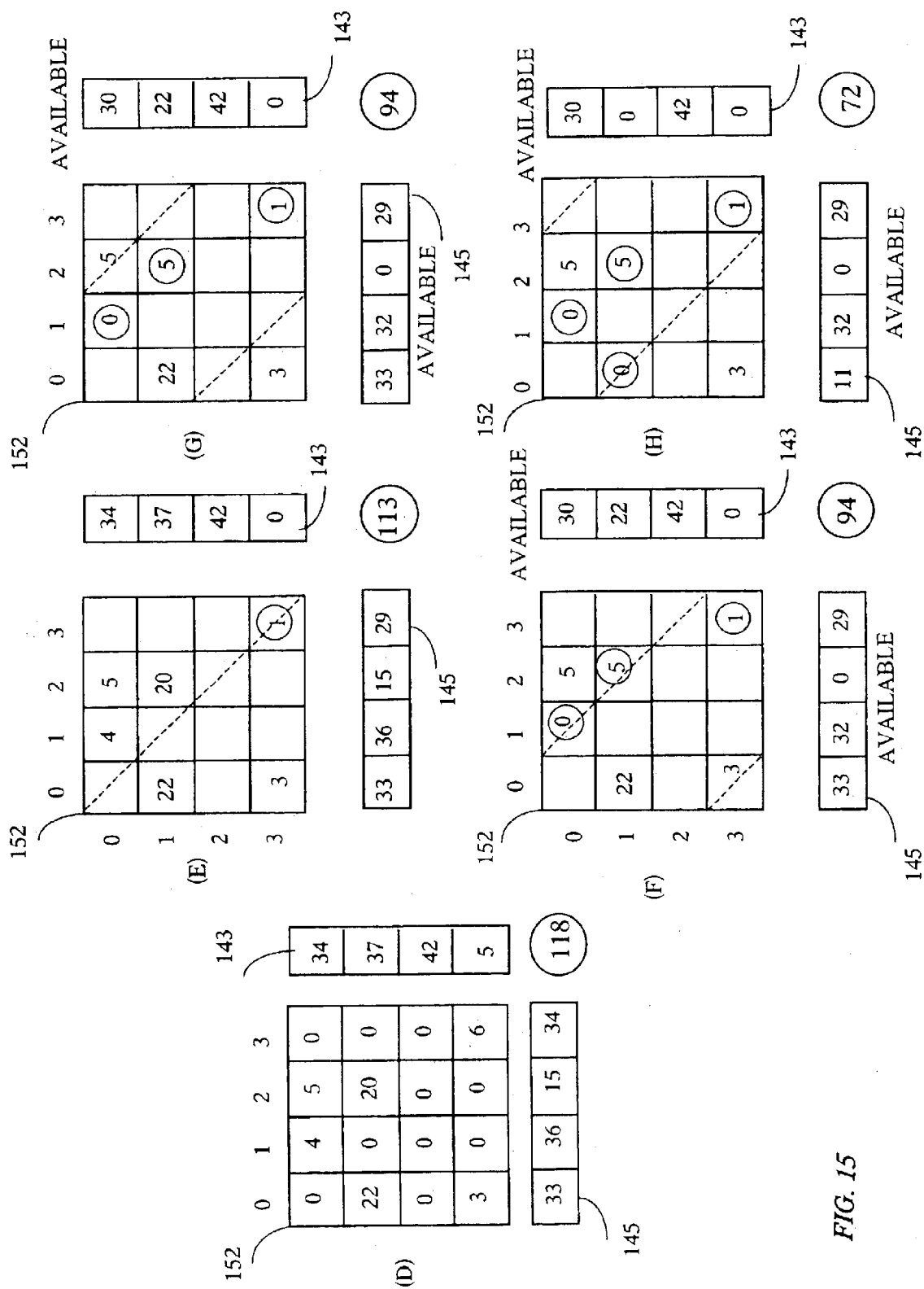
FIG. 15 illustrates a procedure used by an ingress/egress transfer allocation mechanism to distribute the unused capacity of the switch core to selected ingress/egress module pairs based on traffic load.

As shown in FIG. 15, matrix 152(D) obtained by matrix subtraction of matrix 111 minus matrix 123 stores the waiting traffic in excess of the committed capacity for each ingress-egress pair. As described above, this excess traffic is treated as standby traffic. The traffic is expressed in terms of a number of parcels per allocation period. Array 143 stores the total unused capacity for each ingress module 32 and array 145 stores the total unused capacity for each egress module 36. Arrays 143 and 145 are required to implement the capacity-sharing procedure described below.

Figure 14:
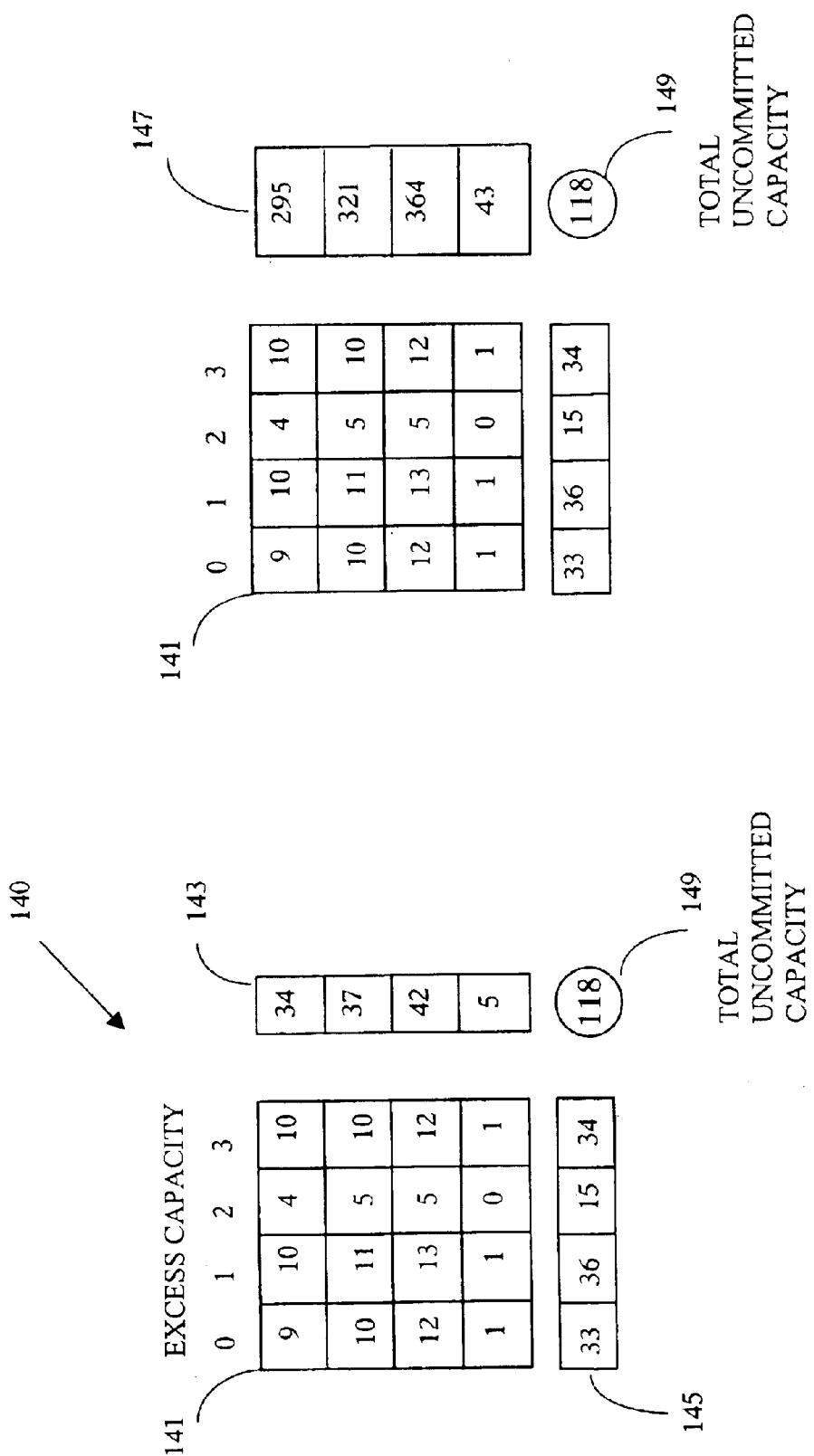
FIG. 14 illustrates a traffic-independent procedure used by an ingress/egress transfer allocation mechanism to distribute the unused capacity of the switch core to selected ingress/egress module pairs.

A non-zero entry in matrix 152(D) indicates waiting traffic in excess of the committed capacity for the entry. The number of non-zero entries in matrix 100(D) can be as high as the number of ingress/egress pairs. In general, it is desirable to fully utilize the ingress/egress paths. In the network context, rate regulation, is actually only relevant at the egress module. Ingress/egress rate regulation is strictly an internal switch-design issue. It is desirable to allocate the excess ingress capacity and excess egress capacity, as illustrated in arrays 143 and 145 (FIG. 14), respectively, to enable the transfer of excess traffic to the egress modules. With 128 ingress modules 32 and 128 egress modules 36, for example, up to 16384 entries may need to be processed during an allocation period (of a 100 microseconds, for example). Each entry may be examined to determine if the indicated number of packet segments 44 can be fully or partially transferred during the subsequent transfer allocation period, based on the current uncommitted capacity of the inner links 38$a,b$ to the core 34 of the switch 30. The process must be completed within a transfer allocation period of a reasonable duration, and parallel processing is required. To avoid transfer allocation collisions, where two or more ingress/egress pairs may be allocated the same unused capacity at a given egress link, the parallel process is preferably implemented using a moving-diagonal method. In the moving-diagonal method, ingress-egress pairs of a diagonal set (as defined earlier) are processed simultaneously. Within a diagonal set, each ingress module 32 is considered only once and each egress module 36 is considered only once in the parallel-computations for the transfer allocation process and no conflicting transfer allocations occur. After processing each diagonal-set, the unused capacity of each ingress and egress module is updated to account for the diagonal-set allocation result.

If the diagonal-set pattern were repeated in each scheduling cycle, the ingress/egress pairs of the diagonal-sets considered first would get a better share of the unused capacity than the ingress/egress pairs of the diagonal-sets considered later in the cycle. To avoid potential unfairness, the starting diagonal is shifted after each N diagonal transfer allocations, N being the number of ingress (or egress) modules.

The diagonal transfer allocation procedure will now be explained with reference to FIG. 15. A diagonal is defined by its first element. For example the diagonal from (0, 0) to (N−1, N−1) is labeled as diagonal (0, 0). In this example, the starting diagonal is selected to be (0, 0), as shown in matrix 152(E) of FIG. 15. Entry (3, 3) in matrix 152(D) contains a number representative of six packet segments 44. Ingress module 3 has an unused capacity (array 143(D)) of five packet segments, while egress module 3 (array 145(D)) has an unused capacity of thirty-four packet segments. The maximum number of packet segments that may be allocated is then the minimum of 6, 5 and 34. The allocated value of 5 is subtracted from entry (3, 3) in matrix 152(E), entry (3) in array 143(E) and entry (3) in array 145(E), yielding the corresponding result in matrix 152(E), array 143(E), and array 145(E) of 1, 0, and 29 respectively.

The second diagonal is selected to be (0, 1) as shown in matrix 152(F) of FIG. 15. The entry (0, 1) in matrix 152(D) has four packet segments waiting for transfer, and the unused capacity in the corresponding ingress and egress modules are thirty-four and thirty-six packet segments, respectively. The four packet segments are therefore allocated, and the corresponding unused capacity in ingress 0 and egress 1 are reduced to thirty and thirty-two packet segments, respectively, as shown in arrays 143(F) and 145(F). Entry (1, 2) has twenty packet segments waiting for transfer, while ingress 1 has thirty-seven uncommitted packet segments and egress 2 has fifteen uncommitted packet segments. Thus, only fifteen out of the twenty packet segments are allocated, and the uncommitted capacities in ingress 1 and egress 2 are reduced to twenty-two and zero, respectively.

This process continues until any of the following conditions is met: (1) all diagonals are visited as shown in matrices 152(E) to 152(H); (2) all the waiting traffic is served; or, (3) the excess capacity is exhausted. In the following transfer allocation period, the procedure preferably starts at a diagonal other than the diagonal (0, 0) to (3, 3) in order to facilitate a fair spatial distribution of the transfer allocations of the waiting traffic. For example the order may be {(0, 0), (0, 1), (0, 2), (0, 3)} in one cycle and {(0, 2), (0, 1), (0, 3), (0, 0)} in the following cycle.

Parcel Assignment

The ingress/egress capacity is modified every transfer allocation cycle according to the varying traffic loads using the mechanism described above. However, it may not be possible to fully utilize the allocated capacities due to scheduling conflicts resulting from the inherent difficulty in fitting the transfer allocations in a time calendar. An efficient scheduling procedure is therefore required to effect a high utilization of the allocated capacity. If the scheduling process is designed to achieve a high efficiency, a small expansion of internal switch speed with respect to combined ingress link speeds would be required to offset the effect of mismatching. Some additional expansion is also required to compensate for the waste that results from the padding probably required in the last packet segment 44 of most packets, and if the packet segments are aggregated into parcels, then the aggregation waste must also be taken into account in the calculation of the required overall expansion.

As mentioned above, either of two parcel assignment methods may be used. The first method determines the assignment in a distributed manner in which each ingress module selects, within a single access interval, the core memory sections available to accept parcels waiting for transfer. The second method is based on looking ahead, scheduling the assignment over a predefined scheduling cycle of several access intervals using a centralized scheduler.

The procedures described above for transfer allocation and transfer assignment have been described with reference to segments as the data units transferred from the ingress modules 32 through the switch core 34 to the egress modules 36. Those procedures also apply equally to the case in which the data units transferred are parcels.

Distributed Assignment

The distributed assignment method is used herein only for the rotator-based architecture. In the rotator-based architecture, the transfer of parcels to the core may be controlled directly by the ingress modules without the use of a central scheduler. The transfer allocation process may still be performed by a central allocation device. The assignment process, which may require N comparisons to be performed each ingress module, N being the number of egress modules, must be completed within the access interval. With distributed assignment, the ingress-egress allocations may be sent to the ingress modules and each ingress module assigns its waiting parcels to their respective sections in the core memories. The allocations may be determined by an admission controller (not shown) or by a transfer allocation device as described above with reference to FIG. 12.

An array of N entries is sent to each ingress module at the beginning of an allocation cycle and is stored in a memory 71, as shown in FIG. 8. Each entry corresponds to an egress module and contains the number of parcels to be transferred to the egress module during the allocation cycle. The allocation cycle may be several rotator cycles in length, as described above. At each ingress module, a memory 73 stores the number of waiting parcels destined for each egress module. Memory 73 is required regardless of the parcel assignment method used—distributed or centralized.

A core memory is a payload data memory which stores parcels to be delivered to the egress modules. With the distributed assignment method, each core memory 66 must have a controller and an associated control memory (not shown) having N entries storing the vacancy in each section 68 of the core memory 66. During each access interval, the controller of each core memory 66 sends an array of N entries showing the vacancy of the sections 68 of the core memory 66 to the ingress module 32 to which it will be connected during a subsequent access interval. The received array is written in a memory 75, overwriting a current content. The maximum number m of parcels that may be transferred during an access interval is determined by the duration of the access interval, amongst other factors, and is a design parameter. The ingress module 32 compares the vacancy array in memory 75 with the allocation array stored in memory 71 and the waiting-parcels array stored in memory 73 and determines the number of parcels to be transferred to selected sections during the subsequent access interval, to a maximum of m parcels. The ingress module 32 may support multi-class traffic, where some classes are associated with rate-regulated traffic with committed service rates and others are associated with standby traffic. In such cases, the parcels sent to the core are selected first from the rate-regulated classes then—according to a fair-priority discipline—from the standby-traffic classes.

At the end of an access interval, the content of memories 71 and 73 are debited according to the assignment. An array of m entries, each containing a section number (i.e., an egress-module number) identifying each assigned parcel is sent back to the respective core memory controller to update its vacancy array. The format of this array is similar to that generated by a centralized scheduler, which will be described below with reference to FIG. 17.

Centralized Parcel Assignment

The centralized assignment process runs in parallel with the payload traffic transfer in the switch. An advantage of centralized scheduling is that it is tolerant to slower circuitry. The scheduling cycle can be chosen to be a multiple of the rotator cycle. This enables the control functions to be performed with relatively slower circuitry in comparison with the distributed assignment method.

As described above, packet segments may be aggregated into parcels in order to simplify the assignment process. The number of packet segments in a parcel varies from 1 to K, K being the maximum number of segments that can be transferred during an access interval. The scheduler, to be described below, comprises N transfer allocation memories, N egress-state memories, and N matching circuits. The transfer allocation memories are refreshed every scheduling cycle. Each transfer allocation memory has N entries, with the $k^{th}$ entry in transfer allocation memory j storing the permissible number of parcels to be transferred from ingress-module j to egress-module k during a current scheduling cycle. The width of each entry is the next higher integer to $\log_2(1+N\times m)$, m being the maximum number of parcels that can be transferred during an access interval. Each egress-state memory has W entries, W being a duration of the scheduling period expressed as a number of consecutive access intervals. W is preferably chosen to be equal to N.

All egress-state memories are initialized with m, m being the maximum number of parcels that can be transferred during an access interval. In the case of a space-core switch architecture, m is always equal to 1, because only one parcel (possibly consisting of several packet segments) may be transferred during an access interval through the space-core. In the case of the rotator-based switch architecture, several parcels of equal size (possibly consisting of several packet segments each) can be transferred during an access interval. Each egress-state memory stores the vacancy of the N egress modules during an access-interval. The width of each entry in an egress-state memory is $\log_2(m+1)$ rounded to nearest higher integer. Thus, in the case of a space-core, the width of each entry is only 1 bit. In the case of a rotator-based core, the width of each entry may be any value from 1 to $\log_2(1+K)$ rounded to nearest higher integer.

A matching process determines the number of parcels that can be transferred from an ingress module to a set of egress modules (one egress module in the case of a space-core switch) during an access interval. The outcome of the matching process is limited by the maximum number, m, of parcels that can be transferred during an access interval.

When m>1, i.e., when more than one parcel may be transferred during an access interval, as in the case of a rotator-based core, the matching process may be implemented as follows:

(1) At any instant, N transfer allocation memories and N egress-state memories in a diagonal-set are paired. Corresponding entries of paired memories are compared to determine the number of parcels that may be transferred from each ingress module to each egress module. At most m parcels may be transferred during an access interval;

(2) Subtract the outcome from the respective entries in transfer allocation memories and the egress-state memories;

(3) Perform steps (1) and (2) for all diagonal-sets;

(4) Repeat steps (1), (2), and (3) using a different order of diagonal-sets.

As mentioned above, although the transfer allocation process ensures that the content of the transfer allocation memories can be accommodated during a scheduling interval, it is possible to obtain a non-zero remainder after all of the diagonal sets are processed in the scheduling cycle. This may result from imperfect scheduling. Near-perfect scheduling requires relatively extensive computational effort, and consequently a relatively long scheduling period. However, to ensure that the scheduling process closely follows traffic variations, it is desirable to keep the scheduling period short, dictating a relatively simple scheduling method. A simple way to compensate for scheduling mismatch loss is to provide a reasonable additional internal expansion in transfer speed between the inner and outer sides of each ingress module 32 and, similarly, between the inner and outer sides of each egress module 36.

Centralized Matching Device

Figure 16:
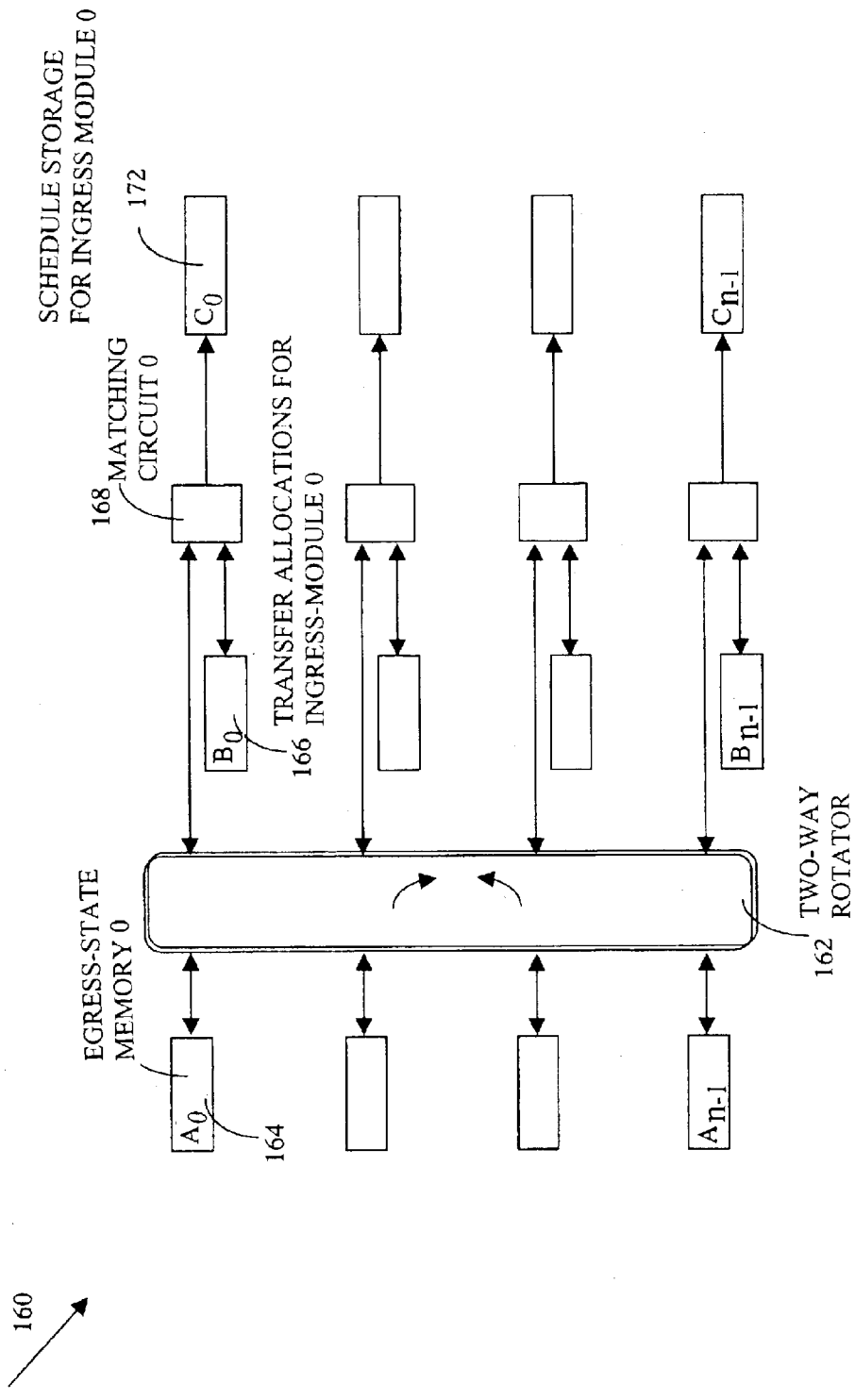
FIG. 16 schematically illustrates a mechanism for spatial matching in an access scheduling process.

The centralized matching device, FIG. 16, includes a bank of N egress-state memories 164, a bank of N transfer allocation memories 166, N matching circuits 168, and N schedule-storage memories 172. A transfer allocation memory 166, a matching circuit 168, and a schedule-storage memory 172 are associated with each ingress module 32. The matching of a transfer allocation array of an ingress module and the N egress-state arrays over a scheduling cycle is enabled using a rotator 162 as shown in FIG. 16.

Each egress-state memory 164 has N entries, each entry representing an occupancy state of an egress module during an access interval. In the case of the space-core architecture, the state of an egress module is represented by one bit because only one parcel can be transferred to an egress module during an access interval (the parcel may contain several packet segments). In the case of a rotator-based switch architecture, the egress-module states during an access interval are represented by the vacancy of each of the N sections 68 of the core memory 66 (FIG. 7) to be accessed. The vacancy of a section is the number of parcels that can be accommodated by the section.

Each transfer allocation memory 166 has N entries (not shown), and each entry holds the number of parcels to be transferred from the ingress module 32 to each of the egress modules 36 within the scheduling period. The transfer allocations are updated during the scheduling process as will be described below.

The matching circuit 168 compares the transfer allocations of an ingress module 32 with the egress-states as read from the egress-state memory 164 to which the ingress module is connected during an access interval. The comparison yields a number, possibly zero, of parcels that can be transferred to the core memory 66 accessed during an access interval and the egress-module designation of each parcel. At most m parcels can be selected, m being equal to 1 in the case of a space-core switch, and up to K in the case of a rotator-based core, K being the maximum number of segments a core-memory section can hold. If m>1, the m parcels may be destined to a number, j, of egress modules, $0 \leq j \leq m$. Each of the j parcels is identified by its egress-module designation. The number j (which may be zero) is written in the schedule-storage memory 172 associated with the respective ingress module, followed by the egress module of each of the j selected parcels (if j>0). The contents of the N schedule-storage memories 172 are pipelined to the respective ingress modules 32 and each ingress module forms a parcel-transfer schedule to follow in the subsequent scheduling period.

Figure 17:
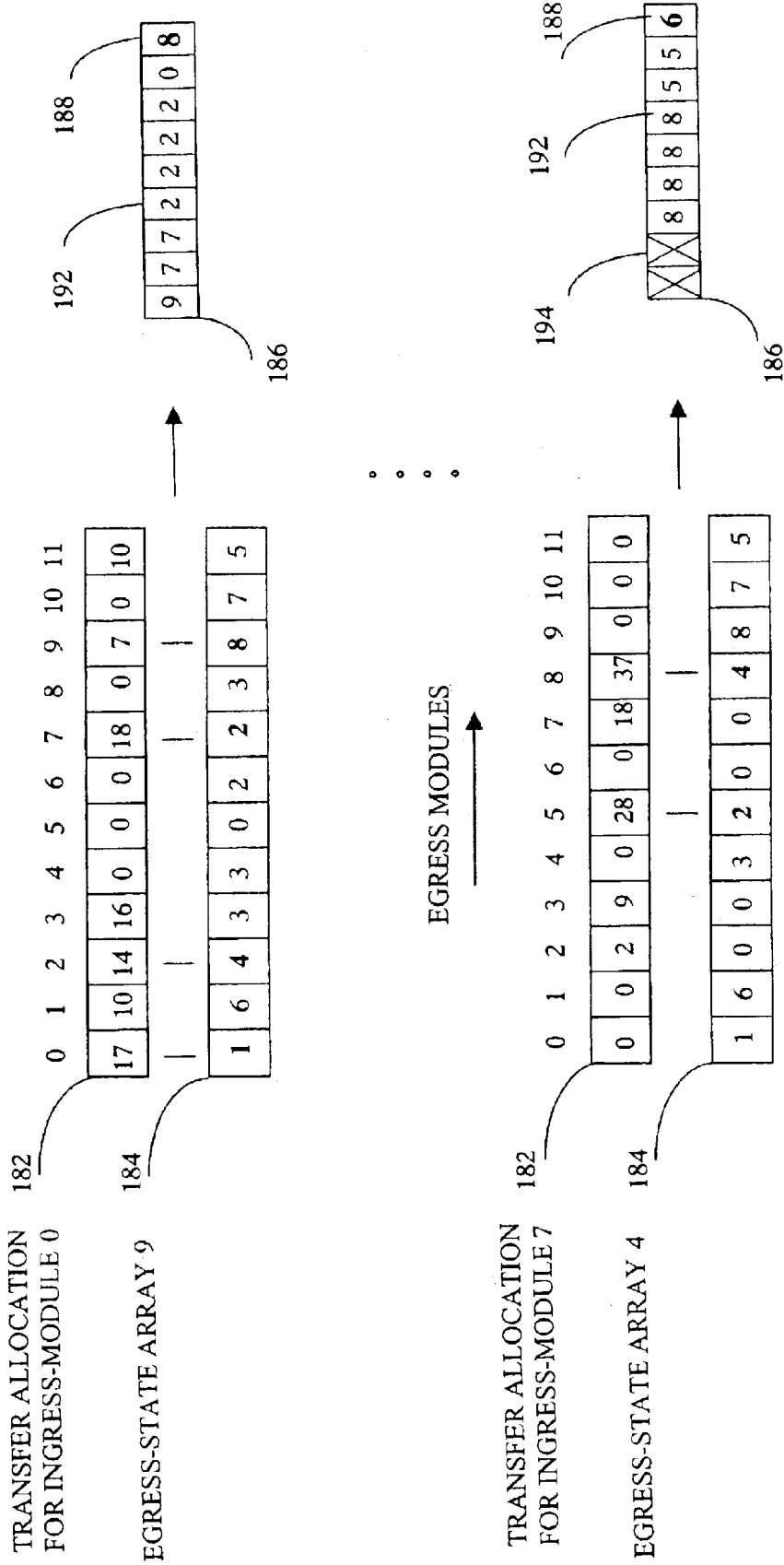
FIG. 17 shows a transfer assignment example.

FIG. 17 shows an example of matching results for the case of eight parcels per access-interval (m=8) in a rotator-based switch. In the example, ingress-module 0 sends a total of 8 parcels to egress-modules 0, 2, 7, and 9, while ingress-module N−1 sends a total of 6 parcels to egress-modules 5, and 8, with two idle parcel-slots. Ingress-module 0 sends one parcel to egress module 0, four parcels to egress-module 2, two parcels to egress-module 7, and one parcel to egress-module 9.

Speeding-Up the Matching Process

The matching process takes place simultaneously for all the memory pairs of a diagonal set. During a scheduling cycle, all diagonal sets are processed. The number of parcels that may be transferred from an ingress module to each egress module for the entire scheduling cycle is determined during the allocation process described above.

The matching process determines the number of parcels that can be transferred from an ingress module x to selected egress modules during a given access interval. The matching process requires that up to N comparisons of two arrays be performed to select the parcels that can be transferred from an ingress module during an access interval. The total number of parcels assigned for transfer is bounded by the predetermined maximum number m of parcels that may be transferred in an access interval.

Figure 19:
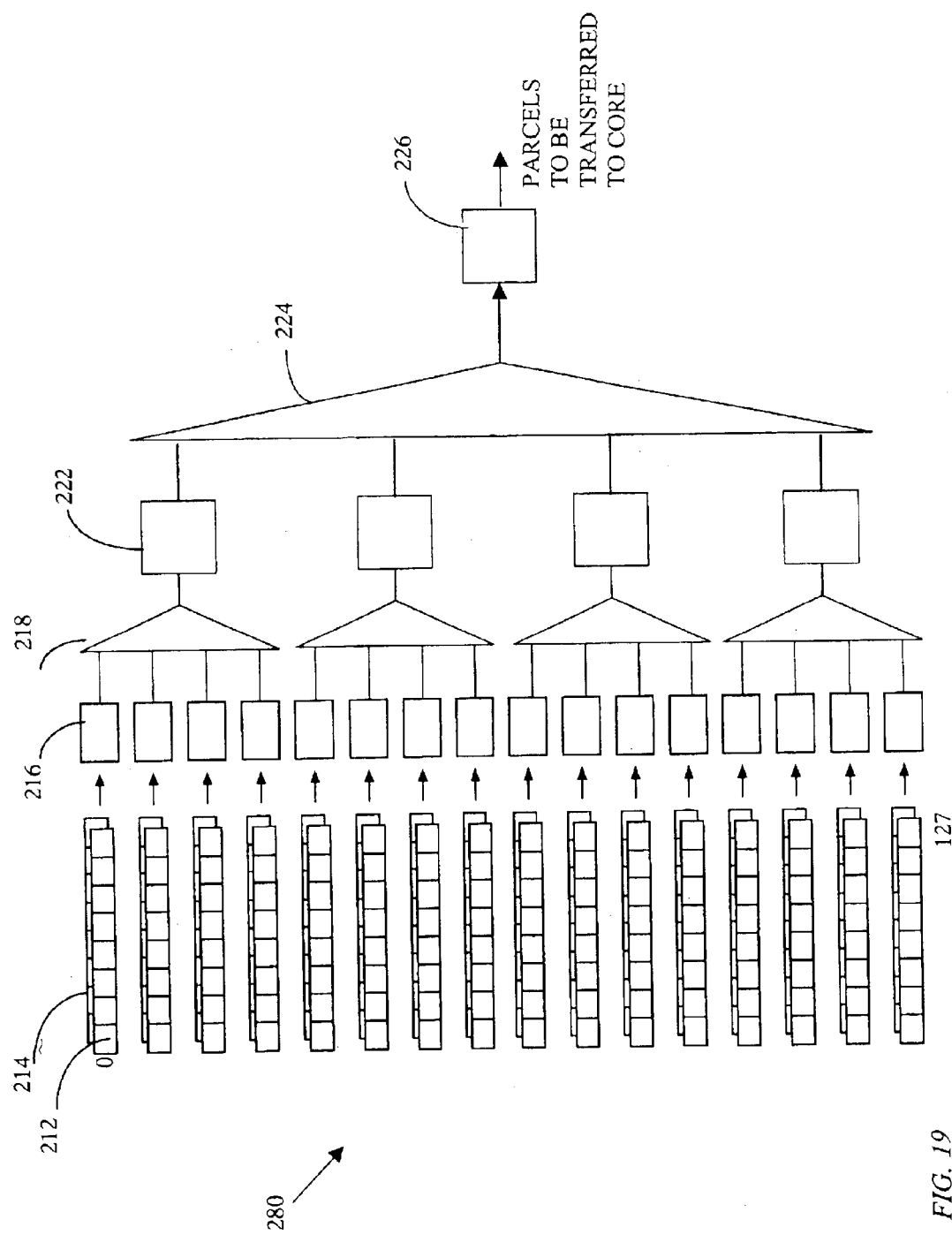
FIG. 19 illustrates an arrangement for implementation of a fast matching process.

In order to speed up the matching process described above, each transfer-allocation array 166 (FIG. 16) of N entries may be subdivided into a number of sub-arrays, each having a smaller number of entries (FIG. 19). Each egress-state array 164 is likewise subdivided, so that there is a one-to-one correspondence between the entries of a transfer-allocation sub-array and the entries of an egress-state sub-array. This permits parallel matching of the entries of the respective sub-array pairs and hence reduces the time required to complete the matching process.

To realize parallel matching of the sub-arrays, the N entries in each memory are placed in a number of separate sub-array memories so that several sub-array matching processes can take place simultaneously and the outcomes of the sub-array matching processes are subsequently examined to select the parcels to be transferred.

The matching process may be implemented in a multi-stage parallel process. To illustrate the benefit of multi-stage processing, consider the case where N=256 and m=16. A single-stage search for matching slots requires up to N comparisons followed by up to m additions, where m is the maximum number of parcel transfers per access interval. Even though, in most cases, the number of comparisons is likely to be much less than N, the design of the matching device should be based on N comparisons. The time required is then determined by the time taken to execute 256 comparisons and up to 16 additions.

If each of the arrays to be matched is divided into 16 sub-arrays of 16 entries each, then 16 matching processes, each involving 16 entries, may be carried out simultaneously. Each of the matching processes yields 0 to 16 matching slots, and a round-robin selection process requiring up to 16 additions determines the number of parcels to be assigned. The time required is then determined by the time taken to execute 16 comparisons and up to 16 additions.

The matching time may be further reduced by using more stages. If n is the number of entries in the sub-array (16 in the above example), and g is the number of stages, such that $n^g = N$, then the number of comparisons is n×g rather than $n^g$. FIG. 18 tabulates the number of operations for g=1, 2, 4, and 8. It is seen that the duration of the matching process, expressed as multiples of the duration of a single operation, decreases from 256, when g=1, to 16 when g=4.

FIG. 19 is a schematic of a device 280 for partitioning the diagonal-set matching process. In FIG. 19, circuit 218 includes a selector and an adder. Also, circuit 224 includes a selector and an adder. In this example, the value of N is 128. Each of the matching arrays, two in this example, is divided into 16 sub-arrays 212 and 214, each sub-array has 8 entries and each matching circuit 216 compares the respective entries of each pair of sub-arrays 212, 214. Each of the circuits 218 adds up the results of four matching circuits, and enters the lesser of the sum and the predetermined limit into a register 222. A third-stage circuit 224 adds up the results in registers 222 and enters the lesser of the sum and the predetermined limit in register 226. Each matching circuit 216 stores the matching result in a memory with up to m entries, and the addresses of the selected parcels in the data-memory storage are determined in a manner well known in the art.

Partitioning and parallel processing, as depicted in FIG. 19, may be used with both the distributed and centralized assignment methods.

Assignment Example

FIG. 17 illustrates the matching process for a space-core or rotator-based switch. The figure relates to a switch with N=12 and m=8. (Each array 184 stores the vacancy of the N egress modules during an access interval j in the succeeding scheduling cycle.) Each array 182 stores the transfer allocations for a respective ingress module. The transfer allocations are expressed as a number of parcels that may be transferred to each egress module during the entire scheduling cycle. The transfer allocations are reduced after each assignment. In an ideal assignment process, the transfer allocations for each ingress module should reduce to zero at the end of each scheduling cycle. However, the assignment process is likely to leave a remainder of unassigned parcels. An internal expansion of the switch, i.e., a ratio of the inner transfer speed to the outer transfer speed greater than unity, can be used to reduce the remainder of unassigned parcels to insignificant levels. Unassigned parcels remain in the ingress queues to be served in subsequent scheduling cycles. Arrays 182 and 184 are stored in separate memories in order to facilitate parallel matching as described earlier.

The matching process is implemented in N steps, where each step corresponds to an access interval and comprises matching of a diagonal set. A diagonal-set comprises N ordered pairs of arrays 182 and 184, e.g., pairs (0, j) to (N−1, {N−1+j} modulo N), $0 \leq j < N$.

During access interval j, $0 \leq j < N$, the transfer allocation array 182 for ingress module 0 is paired with the egress state array 184 of access interval j, the transfer allocation array 182 for ingress module 1 is paired with the egress state array 184 of access interval j+1, and so on. The example of FIG. 17 illustrates the matching process for ingress modules 0 and 7. Transfer allocation array 182 for ingress module 0 is paired with the egress state array 184 of access interval 9 and the transfer allocation array 182 for ingress module 7 is paired with the egress state array 184 for access interval 4 (({7+9} modulo 12).

The outcome of the matching process for ingress modules 0 and 7 in this example are as shown in respective arrays 186. Ingress module 0 has 17 parcels allocated for transfer to egress module 0, but the corresponding egress state array 184 indicates only one available parcel slot. Hence, only one parcel is assigned during access interval 9. The transfer allocation for egress module 2 is 14, but there are only 4 vacant parcel slots, hence 4 parcels are assigned. Similarly two parcels are assigned to egress module 7. The allocation for egress module 9 is 7 parcels while the egress state of egress module 9 indicates 8 vacant parcel slots. The 7 parcels cannot, however, be assigned because the total number of parcels that can be transferred from an ingress module during an access interval is only 8. Hence, only one parcel is assigned for transfer to egress module 9. The matching process need not follow a sequential order as illustrated in this example, where the selected matching transfers are interleaved by other matching opportunities such as the transfer to egress module 1.

The assignment for ingress module 7 yields only 6 parcels, indicated by respective total 188, due to the mismatch of allocations and vacancies as illustrates in FIG. 17. Array 184 indicates vacancies for entries corresponding to egress modules 0, 1, 4, 9, 10, and 11, but the corresponding entries in array 182 indicate that no parcels are allocated for these egress modules. Array 182 is stored in memory 166 (FIG. 16) and array 184 is stored in memory 164 (FIG. 16). The resulting array 186 is stored in memory 172 (FIG. 16).

The outcomes of the diagonal-set matching processes are stored in N arrays 186, each of which shows the number of assigned parcels 188 followed by the egress-identity of each parcel. Arrays 186 are used to decrease the respective entries in arrays 182 and 184. Arrays 186 are transferred to the respective ingress modules for use in the succeeding scheduling cycle.

FIG. 16 shows a two-way rotator 162 which includes a forward rotator and a backward rotator. The forward rotator transfers the contents of memories 164 to the matching circuit 168. The backward rotator transfers a matching result back to the memories 164 to update the egress-state.

The assignment process described above applies to both the space-core and rotator-based switches. In the rotator-based switch, the egress states are represented by the occupancy of the core memories 66. Consequently, corresponding entries in the egress-state arrays 164 used to create a diagonal set used in the assignment process must be restored to full vacancy (a vacancy of 8 parcels each in the example of FIG. 17) to account for the transfer of parcels from the core memories 66 to the egress modules 36. If writing precedes reading in a core memory, then at the end of the matching process for diagonal-set j, entry {X+j} modulo N in the egress-state array 164 paired with each ingress module X, $0 \leq X < N$ and $0 \leq j < N$, is reset to 8. If reading precedes writing, the entries are reset at the start of the diagonal-set matching.

The interpretation of the egress-state arrays 184 for space-core switches differs from that of the rotator-based switch, though this differentiation has no bearing on the procedures described above. In the space-core switch, an array 184 contains the states of the N egress modules during an access interval. In the rotator-based switch, an array 184 contains the states of the N sections 68 of a core memory 66. The sections 68 of a core memory 66 have one-to-one correspondence with the N egress modules 36. Because a core memory 66 stores a parcel for a deterministic number of access intervals before transferring it to the respective egress module, it is necessary to restore the vacancy of one entry in each array 184 with each diagonal-set matching process as described above.

Transfer Allocation/Scheduling Period

In the space-core based switch architecture, the scheduling period is arbitrary and is selected to be long enough to enable the scheduler to complete the necessary computations.

In the rotator-based switch architecture, sending traffic data every J>1 rotator cycles increases the duration of the scheduling period. With J=4, for example, and a rotator cycle of 64 microseconds, the ingress/egress transfer allocations are modified every 256 microseconds. The traffic data sent is treated as though the traffic load were static for J consecutive cycles. With a relatively small J, of 2 to 4 for example, the effect on throughput is generally insignificant.

Segmentation Efficiency

The segmentation efficiency is the ratio of the total size, determined during an observation interval, of incoming packets to the total size of the segmented packets, determined during the same observation interval. The respective sizes are expressed in arbitrary units, bytes for example. The segmentation efficiency increases as the segment size decreases. Increasing the segment size increases the overall node capacity but reduces the segmentation efficiency. Segmentation efficiency is preferably taken into account when selecting the segment size.

Dynamic Computation of the Segmentation Efficiency

The admission control mechanism in the switch (not illustrated), whether based on declared, estimated, predicted, or adaptive service-rates, provides a permissible data load for each ingress/egress pair per rotator cycle. This is based on the actual traffic load, in bytes and does not take into account the effect of packet segmentation and the resulting waste induced by null padding of the last segment of most packets. The transfer allocation mechanism, however, allocates segments, not bytes, and a correction factor is therefore required to compensate for the segmentation waste. The correction may be based on a global estimate of the waste. Preferably, it is determined dynamically for each ingress/egress pair and used to govern the admission control process. The computation of packet sizes before and after segmentation is a straightforward process that is understood by persons skilled in the art of packet switching.

Modified Transfer Allocations

The ingress/egress transfer allocation must take into account the effect of null padding of the last segments of packets to be transferred. A simple approach is to modify the required true transfer allocation by a ratio that is slightly greater than 1+1/(2P), where P is the mean number of segments per packet. P is generally a non-integer number. The transfer rate from the egress module to the egress links (to network destinations) is based on the true allocated rate for a connection, since the null-padding is removed when a packet is presented in a serial bit stream before emission from the switch.

Aggregation Efficiency

The aggregation efficiency $\eta$ is a ratio of the mean number of segments per parcel to the capacity, in segments, of a parcel. The aggregation efficiency $\eta$ increases with (1) an increase in the duration of delay threshold T; (2) a decrease in the maximum number of segments per parcel; and (3) a decrease in the number of ingress (egress) modules N. The worst-case aggregation efficiency is computed using the formula:

$$\eta = 1 - (m^{-1} - K^{-1})(N-1)/T$$

where:

N is the number of ingress modules (or egress modules);
m is the largest number of parcels to be transferred during an access interval;
K is the largest number of segments to be transferred during an access interval (K=m×q, q being the number of segments per parcel); and
The threshold T, expressed as an integer-multiple of the access interval, is larger than N.

The worst-case aggregation efficiency thus calculated may be used in determining the required internal expansion of the switch and in modifying the transfer allocations.

The embodiments of the invention described are intended to be exemplary only. The scope of the invention is therefore intended to be limited solely by the scope of the appended claims.

We claim:

1. A method of switching data packet traffic belonging to multiple classes of service through a switching node in a data network, comprising steps of:

sorting the data packet traffic at each ingress module into traffic streams according to egress module from which the respective data packets must egress from the switching node and class of service;

determining an aggregate committed transfer rate to each traffic stream;

computing an aggregate committed transfer rate for each of the traffic streams destined to a same egress module;

determining traffic loads by counting the number of packet segments in each of the traffic streams;

communicating the aggregate committed transfer rate and the traffic loads to a capacity transfer allocation mechanism; and distributing at the transfer allocation mechanism any switching core capacity that exceeds the aggregate committed transfer rate among ingress/egress pairs based on excess traffic loads.

2. The method as claimed in claim 1 wherein the number of classes of service may be specified for each ingress module.

3. The method as claimed in claim 1 wherein the traffic streams comprise cells of fixed size.

4. The method as claimed in claim 1 wherein the traffic streams comprise fixed-size segments of variable-sized packets.

5. A switching node for switching data packets, comprising:

a plurality of ingress modules each including a segmentation mechanism for deconstructing the packets into segments of a predetermined length at ingress and storing the segments in buffers in accordance with a traffic class of service property;

at least two egress modules;

a switch core for selectively connecting, in a manner transparent to traffic class of service, the ingress modules to the at least two egress modules to enable packets to be transferred therebetween;

a selector for selecting which of the buffered segments stored in a given one of the ingress modules to transfer to the switch core according to the traffic class of service property; and a packet assembly mechanism for reconstructing each packet at egress so that each packet is transferred from the switch in a format in which it was received at the ingress module.

6. The packet switch as claimed in claim 5 wherein the switch core comprises a space-switched core.

7. The packet switch as claimed in claim 5 wherein the switch core comprises a bank of memories interposed between two rotators.

8. A switching node for switching data packets, comprising:
   N ingress modules and M egress modules, N and M being integers greater than one;
   a switching core interposed between the ingress modules and the egress modules;
   an ingress/egress transfer allocation mechanism which periodically receives data related to data packet traffic transferred from each of the respective N ingress modules; and
   an ingress/egress scheduling mechanism which uses data generated by the ingress/egress transfer allocation mechanism to generate a transfer schedule for each of the respective N ingress modules;
   wherein the transfer schedules are periodically communicated to the respective ingress modules.

9. A switching node as claimed in claim 8 wherein the transfer schedule is generated from an ingress/egress transfer allocation matrix and a transfer schedule time frame used for generating the transfer schedule is of arbitrary length.

10. A switching node as claimed in claim 8 wherein the transfer allocation mechanism operates to allocate a capacity of the switching core so that the ingress and egress modules dynamically share an available capacity of the switching core.

11. A switching node as claimed in claim 8 wherein the switching node has a rotator-based switch architecture and the transfer allocation mechanism sends transfer rate allocations directly to each of the N ingress modules, and the respective ingress modules perform distributed spatial matching to achieve local scheduling for the transfer of packet segments to the switching core.

12. The switching node as claimed in claim 8 wherein the ingress/egress transfer allocation mechanism distributes, among the ingress/egress pairs having traffic waiting to be transferred across the switching core, unused capacity in the switching node.

13. A method of distributing unused core capacity in a packet switch having N ingress modules and N egress modules, comprising the steps of:
   storing the unused ingress capacity in N elements of an array X;
   storing the unused egress capacity in N elements of an array Y;
   determining a total unused capacity by summing the N elements of a one of the array X or array Y; and
   computing a transfer allocation of the total unused capacity for each ingress/egress pair by multiplying the respective unused ingress capacities by the respective unused egress capacities to obtain $N^2$ products, and dividing each of the $N^2$ products by the total unused capacity.

14. The method as claimed in claim 13 wherein prior to computing a transfer allocation, either of the multiplicand arrays, X or Y, is modified by dividing each of its elements by the total unused capacity and the transfer allocation for an ingress/egress pair is computed by multiplying the respective elements in array X by the elements in array Y.

15. A method as claimed in claim 14 wherein each element in the modified multiplicand array is left-shifted by an integer B bits before the division and the result of pair-wise multiplication of elements of the modified array and the other array is right-shifted B bits, the integer B being an integer greater than 8.

16. The method as claimed in claim 15 wherein multiplication processes are carried out in parallel.

17. A method of capacity sharing in a packet switch having a plurality of ingress modules and a plurality of egress modules interconnected by a switch core, the method comprising the steps of:
   (a) sending from each ingress module a committed-capacity matrix to a transfer allocation mechanism, each element in the matrix containing the committed capacity of each ingress module with respect to each of the egress modules;
   (b) sending from each ingress module to the transfer allocation mechanism an array storing a number of traffic units waiting to be transferred from the ingress module to each of the egress modules;
   (c) creating at the transfer allocation mechanism a base matrix, each entry in the base matrix being a lesser of corresponding entries in the matrix containing the committed capacity and the matrix containing the traffic units;
   (d) subtracting entries in the base matrix from corresponding entries in the traffic matrix to create a standby traffic matrix;
   (e) computing an unused capacity for each ingress module and each egress module;
   (f) simultaneously processing the N entries in a diagonal set of the standby traffic matrix;
   (g) for each ingress/egress pair belonging to a diagonal set, determining an additional ingress/egress transfer allocation on the basis of the least one of an unused capacity of an ingress module of the ingress/egress pair, an unused capacity of an egress module of the ingress/egress pair, and a corresponding ingress/egress entry in the standby traffic matrix;
   (h) if the additional ingress/egress transfer allocation is greater than zero, subtracting its value from the unused capacity entry at ingress, the unused capacity entry at egress, and the ingress/egress entry in the excess traffic matrix;
   (i) repeating steps (f) to (h) until all diagonals are processed;
   (j) repeating steps (a) to (i) each transfer allocation period; and
   (k) selecting a different order of diagonal processing each transfer allocation period.

18. In a node for switching packet segments comprising N ingress modules, N egress modules, N core memories, each core memory being logically partitioned into N sections, each section corresponding to a one of the egress modules, and each section capable of string m data parcels, a transfer allocation mechanism which determines the number of parcels eligible for transfer from each ingress module to each egress during a scheduling cycle, a parcel scheduler comprising:
   a bank of N egress-state memories, each egress-state memory being logically divided into N sections, each section being adapted to store a number representative of a number of parcels that can be accommodated in a corresponding section in the core memory;
   a bank of N transfer allocation memories, each transfer allocation memory having N entries, each entry corresponding to an ingress/egress module pair and adapted to store any number representative of an eligible parcel transfer allocation for the ingress/egress pair;
   an N×N rotator to cyclically pair the transfer allocation memories and the egress-state memories;
   a bank of N matching circuits, each circuit determining a lesser of a value stored in a transfer allocation memory and a value stored in a corresponding entry in the egress-state memory;

a bank of N result memories, each result memory corresponding to an ingress module and adapted to store a sequence of egress module numbers, each egress module number representing a parcel eligible for transfer to the egress module;

means for subtracting one from the entries of the egress-state memories and the transfer allocation memories for each egress module number in the result memories; and means for transferring the contents of each result memory to its corresponding ingress module.

19. The scheduling apparatus as claimed in claim 18 wherein pairing of the core-image and transfer allocation memories is performed in accordance with different patterns in consecutive scheduling cycles.

20. The method as claimed in claim 18 wherein the process of comparing the transfer allocation memories and the egress-state memories, comprises the steps of:

matching simultaneously corresponding elements in the transfer allocation memories and the egress-state memories to select up to m packet parcels for transfer; and selecting on a round-robin basis a total of up to m packet parcels from the parcels selected for transfer to a corresponding egress module during an egress interval.

21. In a node for switching packet segments comprising N ingress modules, N egress modules, a space switch interconnecting the N ingress modules and the N egress modules, a transfer allocation mechanism which determines the number of parcels eligible for transfer from each ingress module to each egress during a scheduling cycle, a parcel scheduler comprising:

a bank of N egress-state memories, each egress-state memory being logically divided into an array of N 1-bit entries, each entry being representative of the availability of an egress module to accept a parcel;

a bank of N transfer allocation memories, each transfer allocation memory having N entries, each entry corresponding to an ingress/egress module pair and adapted to store any number representative of an eligible parcel transfer allocation for the ingress/egress pair;

an N×N rotator to cyclically pair the transfer allocation memories and the egress-state memories;

a bank of N matching circuits, each circuit determining a lesser of a value stored in a transfer allocation memory and a value stored in a corresponding entry in the egress-state memory;

a bank of N result memories, each result memory corresponding to an ingress module and adapted to store a sequence of egress module numbers, each egress module number representing a parcel eligible for transfer to the egress module;

means for subtracting one from the entries of the egress-state memories and the transfer allocation memories for each egress module number in the result memories; and means for transferring the contents of each result memory to its corresponding ingress module.

22. A method of aggregating segments of digital data in an ingress module of a data packet switch into parcels, each parcel containing at least one and at most a predetermined integer number of the segments, each segment including a unique identifier associated with the ingress module, comprising the steps of:

sorting the segments into logical buffers in a payload memory of the ingress module using an identifier associated with an egress module from which the respective segments must egress from the switch, and a delay tolerance identifier to determine a sort order for the segments;

increasing by 1 a count of a number of waiting segments in each respective buffer each time a new segment is added to a one of the buffers, the count being maintained in a waiting segment count array;

declaring the new segment a critical segment if a respective count of the number of segments in a logical buffer is equal to the predetermined maximum number of segments in a parcel;

initializing a respective entry in a timer array if the new segment is a critical segment;

logically transferring segments from the payload memory to a ready queue associated with each egress module when a waiting segment count is greater than the predetermined number, or a respective entry in the waiting segment count array is greater than zero and a corresponding entry in the timer array exceeds a predetermined time limit associated with the logical buffer and increasing a ready-queue counter and decreasing a respective entry in the waiting segment count array accordingly;

transferring segments from the ready queue in parcels to a next stage of the data packet switch each parcel being padded with null data if the number of waiting segments in the ready-queue is greater than zero but less than the predetermined number and decreasing the ready-queue counter by the number of segments in the parcel after each parcel is transferred out of the ready queue.

23. The segment aggregation method as claimed in claim 22 wherein every entry in the waiting segment count array and every entry in the timer array is examined within a time interval sufficient to transfer a parcel from the ready-queue.

24. The segment aggregation method as claimed in claim 22 wherein the number of delay tolerance identifiers may vary from one ingress module to another ingress module.

* * * * *

UNITED STATES PATENT AND TRADEMARK OFFICE
CERTIFICATE OF CORRECTION

PATENT NO.    : 6,721,271 B1
DATED         : April 13, 2004
INVENTOR(S)   : Maged E. Bashai et al.

It is certified that error appears in the above-identified patent and that said Letters Patent is hereby corrected as shown below:

Column 1,
Line 5, after the title of the patent:
-- STATEMENT REGARDING FEDERALLY SPONSORED RESEARCH OR DEVELOPEMENT
This invention was made with Government support under Technology Investment Agreement F30602-98-2-0194 awarded by the Air Force. The Government has certain rights in this invention. --

Signed and Sealed this

Fifth Day of April, 2005

JON W. DUDAS
*Director of the United States Patent and Trademark Office*